(12) United States Patent
Abrons et al.

(10) Patent No.: US 10,580,062 B1
(45) Date of Patent: Mar. 3, 2020

(54) INTEGRATING PREDEFINED TEMPLATES WITH OPEN TICKET FUNCTIONALITY

(71) Applicant: Square, Inc., San Francisco, CA (US)

(72) Inventors: Adam Abrons, Alameda, CA (US);
Bruce Bell, New York, NY (US);
Mathew Wilson, Sausalito, CA (US);
William Rocklin, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 380 days.

(21) Appl. No.: 15/195,557

(22) Filed: Jun. 28, 2016

(51) Int. Cl.
 *G06Q 30/06* (2012.01)
 *G06Q 20/20* (2012.01)
 *G06F 16/21* (2019.01)

(52) U.S. Cl.
 CPC ....... *G06Q 30/0635* (2013.01); *G06F 16/219* (2019.01); *G06Q 20/20* (2013.01)

(58) Field of Classification Search
 CPC .. G06Q 20/322; G06Q 20/20; G06Q 20/3224; G06Q 20/3274; G06Q 20/385; G06Q 30/02; G06Q 20/10; G06Q 20/206; G06Q 20/202; G06Q 20/354; G06Q 20/3278; G06Q 30/0239; H04W 48/18; H04W 88/06
 USPC ................ 705/16, 26.1, 26.81; 235/375–383
 See application file for complete search history.

(56) References Cited

U.S. PATENT DOCUMENTS

| | | | |
|---|---|---|---|
| 4,485,300 A | 11/1984 | Peirce | |
| 5,980,089 A | 11/1999 | Weis | |
| 6,373,950 B1 | 4/2002 | Rowney | |
| 6,473,740 B2 * | 10/2002 | Cockrill | G06Q 20/04 705/26.81 |
| 6,727,925 B1 | 4/2004 | Bourdelais | |
| 6,732,934 B2 | 5/2004 | Hamilton et al. | |
| 6,920,431 B2 | 7/2005 | Showghi et al. | |
| 7,071,842 B1 | 7/2006 | Brady, Jr. | |
| 7,536,307 B2 * | 5/2009 | Barnes | G06Q 10/02 705/1.1 |

(Continued)

OTHER PUBLICATIONS

Mercury, "Bar Tabs and Credit Cards: The Mixology for POS Developers," Credit Card Acceptance Procedures When Supporting Bar Tabs, pp. 1-9 (May 29, 2014).

(Continued)

*Primary Examiner* — Andrew Joseph Rudy
(74) *Attorney, Agent, or Firm* — Lee & Hayes, P.C.

(57) ABSTRACT

Techniques and arrangements for integrating predefined templates with open ticket functionality. For instance, a merchant device can identify a type of transaction between a merchant and a customer, select a ticket type for the transaction based on the type of transaction, and select a transaction flow based on the ticket type. The merchant device can then generate an open ticket for the transaction based on the ticket type, and associated transaction flow with the open ticket. Additionally, the merchant device can generate a visual representation of data associated with the open ticket, where a layout of the data within the visual representation is based on the type of transaction and the transaction flow, and present the visual representation to the merchant. In some examples, the type of transaction is identified using received input. In some examples, the type of transaction is identified based on a group associated with the customer.

20 Claims, 12 Drawing Sheets

(56) References Cited

U.S. PATENT DOCUMENTS

| | | | |
|---|---|---|---|
| 7,571,468 B1 | 8/2009 | Williams | |
| 7,685,052 B2 | 3/2010 | Waelbroeck et al. | |
| 7,748,621 B2 | 7/2010 | Gusler et al. | |
| 7,756,745 B2 | 7/2010 | Leet et al. | |
| 7,797,204 B2 | 9/2010 | Balent | |
| 7,805,382 B2* | 9/2010 | Rosen | G06Q 10/1053 |
| | | | 705/321 |
| 7,958,029 B1 | 6/2011 | Bobich et al. | |
| 8,069,085 B2* | 11/2011 | Ahlers | G06Q 20/10 |
| | | | 705/17 |
| 8,123,370 B2 | 2/2012 | Maekawa | |
| 8,190,483 B2 | 5/2012 | Woycik et al. | |
| 8,370,207 B2 | 2/2013 | Edwards | |
| 8,671,002 B2 | 3/2014 | Stefik et al. | |
| 8,676,708 B1 | 3/2014 | Honey | |
| 8,694,456 B2 | 4/2014 | Grigg et al. | |
| 8,700,659 B2 | 4/2014 | Skeen et al. | |
| 8,732,193 B2 | 5/2014 | Skeen et al. | |
| 8,738,451 B2* | 5/2014 | Ahlers | G06Q 20/10 |
| | | | 705/17 |
| 8,762,207 B2 | 6/2014 | Kobres | |
| 8,799,111 B2 | 8/2014 | Prellwitz et al. | |
| 8,831,677 B2* | 9/2014 | Villa-Real | H04M 1/66 |
| | | | 455/552.1 |
| 8,856,170 B2 | 10/2014 | Skeen et al. | |
| 8,862,504 B2 | 10/2014 | Sobek | |
| 8,977,567 B2* | 3/2015 | Aabye | G06Q 20/202 |
| | | | 705/39 |
| 9,002,584 B2 | 4/2015 | Van Wiemeersch et al. | |
| 9,037,491 B1 | 5/2015 | Lee | |
| 9,064,359 B2 | 6/2015 | Lert, Jr. et al. | |
| 9,195,982 B2* | 11/2015 | Orr | G06Q 20/204 |
| 9,218,413 B2 | 12/2015 | Skeen et al. | |
| 9,311,639 B2* | 4/2016 | Filler | G06Q 20/367 |
| 9,349,108 B2 | 5/2016 | Skeen et al. | |
| 9,355,470 B2 | 5/2016 | Merrell et al. | |
| 9,390,424 B2 | 7/2016 | Hendrickson | |
| 9,409,978 B2 | 8/2016 | Doxsey et al. | |
| 9,430,784 B1 | 8/2016 | Frederick et al. | |
| 9,444,932 B2 | 9/2016 | Ravenel et al. | |
| 9,515,999 B2 | 12/2016 | Ylonen | |
| 9,536,243 B2 | 1/2017 | Khan | |
| 9,563,890 B2* | 2/2017 | Zhou | G06Q 20/3278 |
| 9,569,757 B1* | 2/2017 | Wilson | G06Q 20/0453 |
| 9,576,285 B2* | 2/2017 | Zhou | G06Q 20/3278 |
| 9,576,289 B2 | 2/2017 | Henderson et al. | |
| 9,582,797 B1 | 2/2017 | Holmes et al. | |
| 9,633,344 B2* | 4/2017 | Nathanel | G06Q 20/20 |
| 9,666,023 B2* | 5/2017 | Irwin, Jr. | G07F 17/3225 |
| 9,734,463 B2 | 8/2017 | Skeen et al. | |
| 9,785,930 B1 | 10/2017 | Terra et al. | |
| 9,799,028 B2 | 10/2017 | Dickelman | |
| 9,799,380 B2* | 10/2017 | Liabraaten | G11C 7/1075 |
| 9,817,646 B1 | 11/2017 | Chen et al. | |
| 9,824,233 B2 | 11/2017 | Kaplan et al. | |
| 9,824,408 B2* | 11/2017 | Isaacson | G06Q 20/12 |
| RE46,731 E | 2/2018 | Woycik et al. | |
| 9,922,324 B2 | 3/2018 | Wilson et al. | |
| 9,934,784 B2* | 4/2018 | May | G06Q 20/102 |
| 9,940,374 B2 | 4/2018 | Orumchian et al. | |
| 9,959,529 B1 | 5/2018 | Varma et al. | |
| 9,965,755 B2* | 5/2018 | Richelson | G06Q 20/202 |
| 9,972,003 B2 | 5/2018 | Mooring, II et al. | |
| 10,007,953 B1 | 6/2018 | Nathoo et al. | |
| 10,019,011 B1 | 7/2018 | Green et al. | |
| 10,019,149 B2 | 7/2018 | Chirakan et al. | |
| 10,019,698 B1* | 7/2018 | Scott | G06Q 20/202 |
| 10,026,062 B1* | 7/2018 | Sasmaz | G06Q 10/1053 |
| 10,031,420 B2* | 7/2018 | Ongayi | G03F 7/091 |
| 10,032,171 B2* | 7/2018 | Yeager | H04L 9/321 |
| 10,043,162 B1* | 8/2018 | Renke | G06Q 20/102 |
| 10,043,209 B2* | 8/2018 | Cooke | G06F 3/017 |
| 10,055,722 B1 | 8/2018 | Chen et al. | |
| 10,068,225 B2* | 9/2018 | Barrett | G06Q 20/342 |
| 10,068,272 B1* | 9/2018 | Varma | G06Q 30/0635 |
| 10,074,148 B2 | 9/2018 | Cashman et al. | |
| 10,078,820 B2 | 9/2018 | Renke et al. | |
| 10,091,617 B2 | 10/2018 | Chicoine et al. | |
| 10,210,569 B1* | 2/2019 | Kim | G06Q 40/00 |
| 10,289,991 B1* | 5/2019 | Muller | G06Q 20/202 |
| 10,289,992 B1* | 5/2019 | Bell | G06Q 20/202 |
| 10,311,420 B1 | 6/2019 | Bell et al. | |
| 10,313,383 B2* | 6/2019 | Sommer | G06Q 20/4016 |
| 10,319,042 B2* | 6/2019 | Arvapally | G06Q 40/12 |
| 10,346,605 B2* | 7/2019 | Narasimhan | G06F 21/36 |
| 10,360,648 B1 | 7/2019 | Rocklin et al. | |
| 2003/0174823 A1 | 9/2003 | Justice et al. | |
| 2004/0243468 A1 | 12/2004 | Cohagan et al. | |
| 2006/0143087 A1 | 6/2006 | Tripp et al. | |
| 2006/0178986 A1 | 8/2006 | Giordano et al. | |
| 2008/0015987 A1 | 1/2008 | Ramavarjula et al. | |
| 2008/0313047 A1 | 12/2008 | Casares et al. | |
| 2008/0319914 A1 | 12/2008 | Carrott | |
| 2009/0063312 A1 | 3/2009 | Hurst | |
| 2009/0065572 A1 | 3/2009 | Jain | |
| 2009/0083069 A1 | 3/2009 | Tierney et al. | |
| 2009/0090783 A1 | 4/2009 | Killian et al. | |
| 2009/0157518 A1 | 6/2009 | Bishop et al. | |
| 2009/0192913 A1 | 7/2009 | Saito et al. | |
| 2009/0228336 A1 | 9/2009 | Giordano et al. | |
| 2009/0240624 A1 | 9/2009 | James et al. | |
| 2010/0010906 A1 | 1/2010 | Grecia | |
| 2010/0088207 A1 | 4/2010 | McLaughlin et al. | |
| 2010/0174620 A1 | 7/2010 | Stringfellow et al. | |
| 2010/0217674 A1 | 8/2010 | Kean | |
| 2011/0022472 A1 | 1/2011 | Zon | |
| 2011/0087592 A1 | 4/2011 | van der Veen et al. | |
| 2011/0215159 A1 | 9/2011 | Jain | |
| 2011/0238510 A1 | 9/2011 | Rowen et al. | |
| 2011/0251892 A1 | 10/2011 | Laracey | |
| 2011/0251909 A1 | 10/2011 | Clark | |
| 2011/0288967 A1 | 11/2011 | Selfridge | |
| 2011/0320345 A1 | 12/2011 | Taveau et al. | |
| 2012/0130787 A1 | 5/2012 | Stouffer et al. | |
| 2012/0130899 A1 | 5/2012 | McMonagle et al. | |
| 2012/0209749 A1 | 8/2012 | Hammad et al. | |
| 2012/0330837 A1 | 12/2012 | Persaud et al. | |
| 2013/0226805 A1 | 8/2013 | Griffin et al. | |
| 2013/0238455 A1 | 9/2013 | Laracey | |
| 2014/0244409 A1 | 8/2014 | Nathanel et al. | |
| 2014/0258011 A1 | 9/2014 | Shore | |
| 2014/0263622 A1* | 9/2014 | Babatz | G06Q 20/34 |
| | | | 235/380 |
| 2014/0279534 A1 | 9/2014 | Miles | |
| 2014/0351130 A1 | 11/2014 | Cheek et al. | |
| 2014/0372300 A1 | 12/2014 | Blythe | |
| 2015/0032567 A1 | 1/2015 | Bhatia | |
| 2015/0033286 A1 | 1/2015 | Shahidzadeh et al. | |
| 2015/0095225 A1 | 4/2015 | Appana et al. | |
| 2015/0120345 A1 | 4/2015 | Rose | |
| 2015/0213565 A1 | 7/2015 | Garrett et al. | |
| 2015/0242854 A1 | 8/2015 | Hayhow | |
| 2015/0278789 A1 | 10/2015 | Richelson et al. | |
| 2015/0287006 A1 | 10/2015 | Hunter et al. | |
| 2016/0247113 A1 | 8/2016 | Rademaker | |
| 2016/0307176 A1 | 10/2016 | Renke et al. | |
| 2016/0335613 A1 | 11/2016 | Laracey | |
| 2016/0353235 A1 | 12/2016 | Williams et al. | |
| 2017/0004475 A1* | 1/2017 | White | G06Q 20/204 |
| 2017/0083901 A1* | 3/2017 | Spencer, II | G06Q 20/322 |
| 2017/0124671 A1* | 5/2017 | Tam | G06Q 50/14 |
| 2017/0161851 A1 | 6/2017 | Li et al. | |
| 2018/0039965 A1 | 2/2018 | Han et al. | |
| 2018/0181937 A1 | 6/2018 | Wilson et al. | |
| 2018/0330346 A1 | 11/2018 | Grassadonia et al. | |
| 2018/0341933 A1 | 11/2018 | Renke et al. | |

OTHER PUBLICATIONS

Non-Final Office Action dated Jun. 25, 2015, for U.S. Appl. No. 14/675,555, of Renke, C.P., et al., filed Mar. 31, 2015.

(56) References Cited

OTHER PUBLICATIONS

Final Office Action dated Dec. 31, 2015, for U.S. Appl. No. 14/675,555, of Renke, C.P., et al., filed Mar. 31, 2015.
Non Final Office Action dated Dec. 16, 2016, for U.S. Appl. No. 14/675,555, of Renke, C.P., et al., filed Mar. 31, 2015.
Non Final Office Action dated Jan. 18, 2017, for U.S. Appl. No. 14/675,565, of Renke, C.P., et al., filed Mar. 31, 2015.
Final Office Action dated Jul. 26, 2017, for U.S. Appl. No. 14/675,555, of Renke, C.P., et al., filed Mar. 31, 2015.
Advisory Action dated Nov. 8, 2017, for U.S. Appl. No. 14/675,555, of Renke, C.P., et al., filed Mar. 31, 2015.
Final Office Action dated Dec. 14, 2017, for U.S. Appl. No. 14/675,565, of Renke, C.P., et al., filed Mar. 31, 2015.
Non Final Office Action dated Feb. 27, 2018, for U.S. Appl. No. 14/675,555, of Renke, C.P., et al., filed Mar. 31, 2015.
Notice of Allowance dated Mar. 29, 2018, for U.S. Appl. No. 14/675,565, of Renke, C.P., et al., filed Mar. 31, 2015.
Non Final Office Action dated Jun. 19, 2018, for U.S. Appl. No. 15/905,643, of Wilson, M., et al., filed Feb. 26, 2018.
Non Final Office Action dated Aug. 14, 2018, for U.S. Appl. No. 15/185,354, of Bell, B., et al., filed Jun. 17, 2016.
Non Final Office Action dated Aug. 15, 2018, for U.S. Appl. No. 15/185,383, of Bell, B., et al., filed Jun. 17, 2016.
Final Office Action dated Sep. 4, 2018, for U.S. Appl. No. 14/675,555, of Renke, C.P., et al., filed Mar. 31, 2015.
Non Final Office Action dated Oct. 10, 2018, for U.S. Appl. No. 15/189,131, of Rocklin, W., et al., filed Jun. 22, 2016.
Notice of Allowance dated Aug. 14, 2019, for U.S. Appl. No. 14/675,555, of Renke, C.P., et al., filed Mar. 31, 2015.
Advisory Action dated Nov. 30, 2018, for U.S. Appl. No. 14/675,555, of Renke, C.P., et al., filed Mar. 31, 2015.
Notice of Allowance dated Dec. 11, 2018, for U.S. Appl. No. 15/905,643, of Wilson, M., et al., filed Feb. 26, 2018.
Notice of Allowance dated Dec. 28, 2018, for U.S. Appl. No. 15/185,383, of Bell, B., et al., filed Jun. 17, 2016.
Notice of Allowance dated Jan. 15, 2019, for U.S. Appl. No. 15/185,354, of Bell, B., et al., filed Jun. 17, 2016.
Advisory Action dated Jan. 24, 2019, for U.S. Appl. No. 14/675,555, of Renke, C.P., et al., filed Mar. 31, 2015.
Advisory Action dated Feb. 21, 2019, for U.S. Appl. No. 14/675,555, of Renke, C.P., et al., filed Mar. 31, 2015.
Notice of Allowance dated Mar. 6, 2019, for U.S. Appl. No. 15/189,131, of Rocklin, W., et al., filed Jun. 22, 2016.
Notice of Allowance dated Jun. 24, 2019, for U.S. Appl. No. 15/721,522, of Svenson, T., et al., filed Sep. 29, 2017.

* cited by examiner

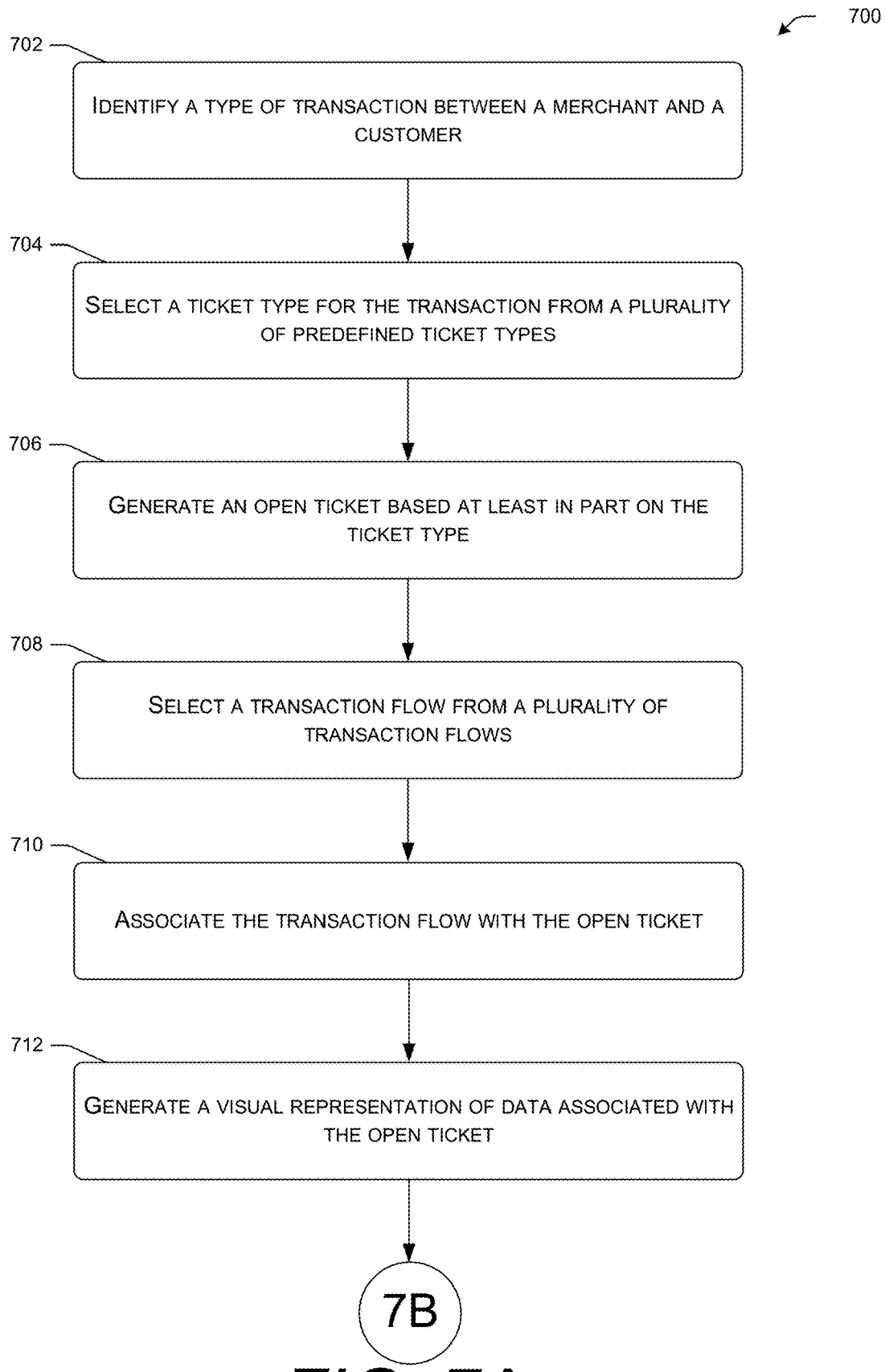

INTEGRATING PREDEFINED TEMPLATES WITH OPEN TICKET FUNCTIONALITY

BACKGROUND

In today's commerce, merchants utilize point-of-sale (POS) devices when conducting transactions with customers. For instance, a merchant can input data into a POS device, such as items ordered by a customer during a transaction. The POS device can then use the data to generate a ticket for the transaction. After generating the ticket, the POS device can present the ticket to the merchant. The merchant can then use the ticket when conducting the transaction with the customer. Additionally, at the end of the transaction, the merchant can use the ticket to process the transaction for the customer.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

FIGS. 7A-7B are a flow diagram illustrating an example process for integrating predefined templates with open ticket functionality.

DETAILED DESCRIPTION

Figure 1:
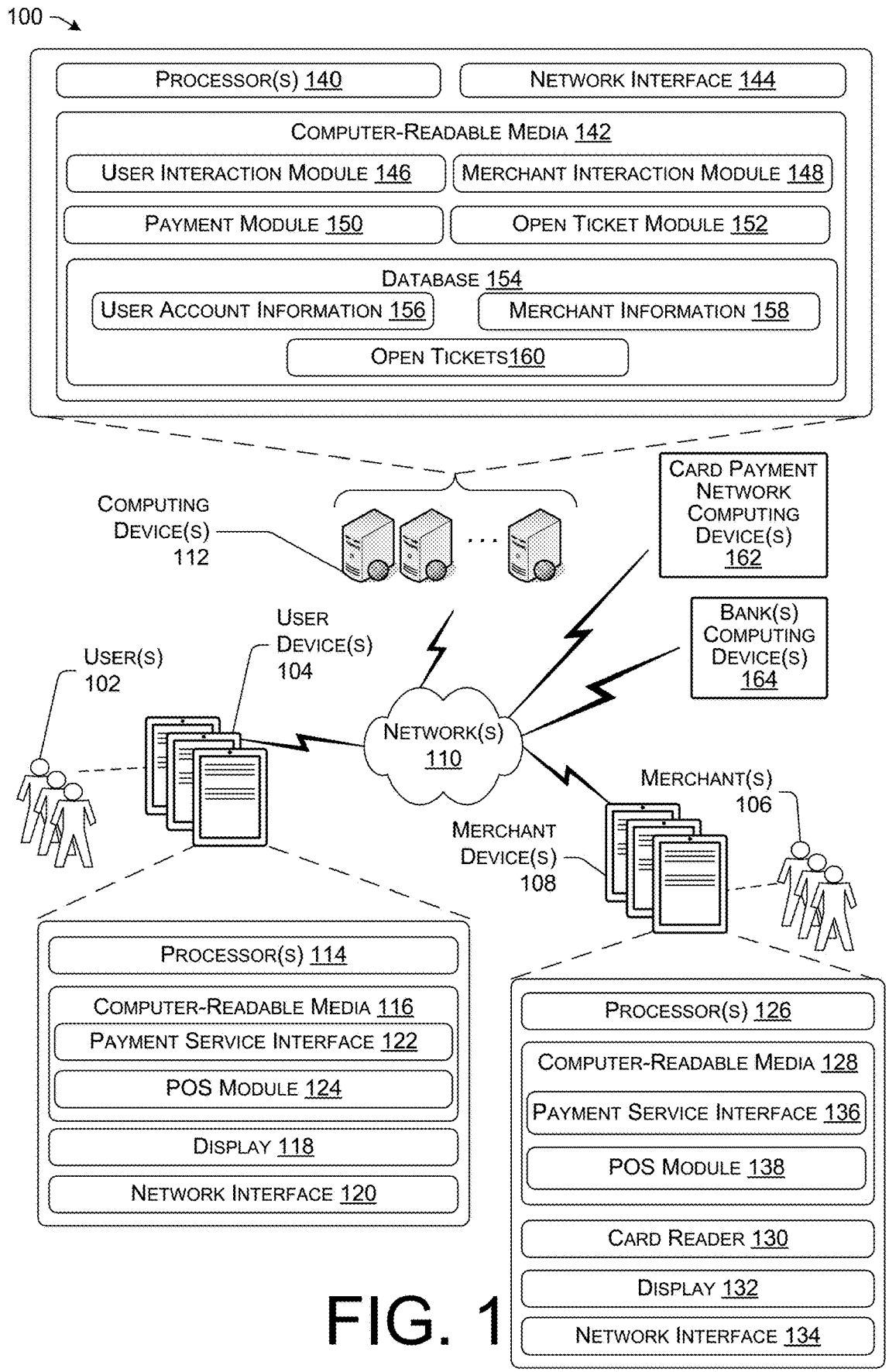
FIG. 1 illustrates an example system for handling open ticket transactions among customers and merchants.

This disclosure describes systems and processes for integrating predefined templates with open ticket functionality. In some examples, a merchant can utilize a point-of-sale (POS) to conduct transactions with customers. For instance, the merchant can input data associated with each of the transactions into the POS device. The POS device can then generate open tickets for the transactions using the inputted data. In some examples, an open ticket is a data structure that stores information associated with interactions between the merchant and customers during the course of a transaction. In some examples, the open ticket data structure can include an associated versioning data structure that the POS device uses when synchronizing the open ticket data structure with other merchant devices (e.g., other POS devices). For instance, the associated versioning data structure can include a vector that indicates each time the open ticket data structure is updated by one of the POS devices.

In some examples, the POS device can generate the open tickets using predefined ticket templates (e.g., predefined ticket types). Predefined ticket templates can define which elements are included within open tickets. For instance, a predefined ticket template can define which graphics, text, interactive elements, or the like are included within an open ticket. The predefined ticket templates can further define a layout for the elements within the open tickets. For instance, the predefined ticket template above can define a layout for the graphics, text, interactive elements, or the like. In some examples, the POS device selects which predefined ticket template to use for an open ticket of a transaction based on a type of transaction that the merchant is conducting the customer.

For instance, the POS device can associate predefined ticket templates with various types of transactions. Types of transactions can include transactions that occur at the physical establishment of the merchant and/or transactions that occur outside of the physical establishment of the merchant. At the physical establishment of the merchant, types of transactions can be based zones/stations within the physical establishment of the merchant. For instance, in some examples, the types of transactions can include restaurant area transactions, bar area transactions, waiting area transactions, patio area transactions, or the like. Outside of the physical establishment of the merchant, types of merchants can include delivery type transactions.

To generate an open ticket using the predefined ticket templates, the POS device identifies the type of transaction that is being conducted between the merchant and the customer. For instance, the POS device can receive input associated with a transaction between the merchant and the customer. In some examples, the input can indicate the type of transaction that is being conducted between the merchant and the customer (e.g., a restaurant area transaction). Additionally or alternatively, in some examples, the input can indicate a group (e.g., the zone/station) associated with the customer. In such examples, the POS device can determine the type of transaction based on the group. The POS device can then select the predefined ticket template for the transaction based on the association between the predefined ticket template and the identified type of transaction. Using the predefined ticket template, the POS device can then generate an open ticket for the transaction between the merchant and the customer.

In some examples, the POS device can further associated transaction flows with the open ticket. Transaction flows can define one or more process(es) that the merchant is to perform during the transaction with the customer. For instance, a transaction flow can include various steps associated with the transaction, such as when to input data associated with the customer, when to input data associated with customer orders, when to process the transaction, whether to provide the customer with a physical and/or digital receipt, or the like. In some examples, the POS device selects the transaction flow for the open ticket based on the predefined ticket template that the POS device uses to generate the open ticket.

After generating the open ticket, the POS device can present the open ticket to the merchant. For instance, the POS device can generate a visual representation of data associated with the open ticket, and present the visual representation of the data via a display device. The merchant can then utilize the visual representation during the course of the transaction with the customer. For instance, in some examples, the merchant can utilize the visual representation to add additional orders made by the customer to the open ticket. In some examples, the merchant can utilize the visual representation to merge the open ticket with an additional open ticket. In some examples, the merchant can utilize the visual representation to modify the type of transaction associated with the transaction. When modifying the type of transaction, the POS device can update the open ticket using a new predefined ticket template and/or transaction flow. Additionally, in some examples, the merchant can utilize the visual representation to process the transaction with the customer.

It should be noted that, in some examples, a third-party service (e.g., payment service) can generate the open tickets for the merchant using a similar process as the POS device above. For instance, the third-party service can receive, from the POS device, data associated with a transaction between the merchant and a customer. The third-party service can then use the data to identify a type of transaction for the transaction between the merchant and the customer. Based on the identified type of transaction, the third-party service can generate an open ticket for the transaction using a predefined ticket template. The third-party service can further associate a transaction flow with the open ticket. After generating the open ticket, the third-party service can send data associated with the open ticket to the POS device and/or another POS device associated with the merchant.

By generating open tickets using the processes described above, computer-related technology on POS devices (and/or third-party services) that generate open tickets is improved. For instance, the POS devices generate open tickets that are personalized to the types of data that the merchant inputs into the POS devices for the transactions. For instance, in some examples, an open ticket for a delivery type transaction may include interactive elements utilized by the merchant to input data associated with an address of the customer, while an open ticket associated with a restaurant type transaction may not include the same functionality. Additionally, processes performed by the POS device are personalized towards the type of transaction being performed by the merchant. For instance, a transaction flow associated with an open ticket may cause the POS device to generate and provide messages and/or alerts to the merchant that are specific to the type of transaction that is being conducted by the merchant.

FIG. 1 illustrates an example system 100 for handling open ticket transactions among customers and merchants. More particularly, FIG. 1 provides a framework for integrating predefined ticket templates with POS functionality on merchant devices. For instance, in some examples, the system 100 can generate open tickets for a merchant using predefined ticket templates. Additionally, in some examples, the system 100 can associate transaction flows with generated open tickets.

As shown in FIG. 1, the system 100 may include one or more user(s) 102 (e.g. customers), one or more user device(s) 104 associated with the user(s) 102, one or more merchants 106, one or more merchant devices 108 associated with the one or more merchants 106, one or more network(s) 110, and one or more computing device(s) 112. In various implementations, the user(s) 102 may operate the user device(s) 104, which may include one or more processor(s) 114, computer-readable media 116, a display 118 and a network interface 120. The computer-readable media 116 may store a payment service interface 122 and a POS module 124. Similarly, the merchant(s) 106 may operate the merchant device(s) 108, which may include one or more processor(s) 126, computer-readable media 128, a card reader 130, a display 132 and a network interface 134. The computer-readable media 126 may store a payment service interface 136 and a POS module 138. The computing device(s) 112 may also include one or more processor(s) 140, computer-readable media 142 and a network interface 144. The computer readable media 142 may store a user interaction module 146, a merchant interaction module 148, a payment module 150, an open ticket module 152, and a database 154.

In some implementations, one of the users 102 may operate a user device 104 to perform various functions associated with the user device 104. For example, a user of the user(s) 102 may utilize the user device 104, and particularly the payment service interface 122 thereof, to interact with the computing device(s) 112 via the network interface 120 to establish a user account with the payment service of the computing device(s) 112. In addition, a user of the user(s) 102 may utilize POS module 124 of the user device 104 to interface with the POS module 138 of the merchant device(s) 108, e.g. as part of a transaction using the payment service of the computing device(s) 112. For example, the user device 104 may communicate via the network interface 120 with the merchant device(s) 108 and the network interface 134. As an example of such a payment operation, the POS module 138 of the merchant device 108 may communicate with the POS module 124 of the user device 104 to obtain information for processing a payment from the user 102 to the merchant 106 using the payment service of the computing device(s) 112.

In some implementations, the user device 104 may be any type of device that is capable of interacting with the merchant device(s) 108 and/or the computing device(s) 112. For instance, the user device 104 may include a personal computer, a laptop computer, a cellular telephone, a PDA, a tablet device, or any other device. The user device 104 shown in FIG. 1 is only one example of a user device 104 and is not intended to suggest any limitation as to the scope of use or functionality of any user device 104 utilized to perform the processes and/or procedures described herein. For example, the user device 104 may include various other applications or modules, such as a module for a user dashboard to enable the user to control information in a user's profile, set user preferences, and so forth.

The processor(s) 114 of the user device 104 may execute one or more modules and/or processes to cause the user device 104 to perform a variety of functions, as set forth above and explained in further detail in the following disclosure. In some implementations, the processor(s) 114 may include a central processing unit (CPU), a graphics processing unit (GPU), both CPU and GPU, or other processing units or components known in the art. Additionally, each of the processor(s) 114 may possess its own local memory, which also may store program modules, program data, and/or one or more operating systems.

Depending on the exact configuration and type of the user device 104, the computer-readable media 116 may include volatile memory (such as RAM), non-volatile memory (such as ROM, flash memory, miniature hard drive, memory card, or the like), or some combination thereof.

In various implementations, the user device 104 may also have input device(s) such as a keyboard, a mouse, a pen, a voice input device, a touch input device, etc. The user device 104 may also include the display 118 and other output device(s), such as speakers, a printer, etc. The user 102 may utilize the foregoing features to interact with the user device 104, merchant device(s) 108 or the computing device(s) 112 via the network(s) 110. More particularly, the display 118 of the user device 104 may include any type of display 118 known in the art that is configured to present (e.g., display) information to the users 102.

In various implementations, the one or more merchants 106 may be any individual, entity, or machine that offers products, services or the like according to the examples herein. Moreover, each of the merchants 106 may be associated with one or more merchant devices 108, which may be the same as, similar to, or different from the user devices 104. The merchant devices 108 may include any number of components such as the one or more processor(s) 126, the computer-readable media 128, the card reader 130, the display 132 and/or network interface 134. The merchants 106 may utilize the merchant devices 108 to interact with the user device(s) 104 and/or computing device(s) 112 in any manner. For instance, the merchant devices 108 may be used to access an interface associated with the computing device(s) 112 (e.g. the payment service interface 136). Continuing the above example, a merchant device 108 may utilize information obtained from interacting with the POS module 124 of the user device 104 to execute the payment from the user 102 to the merchant 106 through the payment service of the computing device(s) 112. Further, the POS module 138 may control the operation of the card reader 130 to read payment information from credit cards, debit cards, gift cards and the like. Moreover, the POS module 138 may operate to interact with the card payment network computing devices(s) 162 and/or bank(s) computing device(s) 164 to execute payments from the user 102 to the merchant 106.

While the user devices 104 and merchant devices 108 are shown as including different modules, this is merely for ease of illustration and not intended as limiting. In various implementations, the user devices 104 and merchant devices 108 may be identical, similar or distinct. Moreover, the modules shown and described for the user devices 104 and merchant devices 108 may be implemented as more modules or as fewer modules and functions described for the modules may be redistributed depending on the details of the implementation. Further, in some implementations, the user devices 104 and/or merchant devices 108 may vary from device to device. In general, the user devices 104 and the merchant devices 108 can each be any appropriate device operable to send and receive requests, messages, or other types of information over the one or more networks 110 or directly to each other. Additionally, in some implementation, there may be thousands, hundreds of thousands, or more, of the user devices 104 and the merchant devices 108.

In some implementations, the network(s) 110 may be any type of network known in the art, such as a local area network or a wide area network, such as the Internet, and may include a wireless network, such as a cellular network, a local wireless network, such as Wi-Fi and/or close-range wireless communications, such as Bluetooth® and Bluetooth® low energy, near field communications (NFC), a wired network, or any other such network, or any combination thereof. Accordingly, the one or more networks 110 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Consequently, the user devices 104, the merchant devices 108, and the computing device(s) 112 may communicatively couple to the network(s) 110 in any manner, such as by a wired or wireless connection. The network(s) 110 may also facilitate communication between the user devices 104, the merchant devices 108, and the computing device(s) 112. In turn, the network interfaces 120, 134 and 144 of the user devices 104, the merchant devices 108, and the computing device(s) 112 may be any network interface hardware components that may allow user devices 104, the merchant devices 108, and the computing device(s) 112 communicate over the network(s) 110. For example, in a particular implementation, the network interfaces 120 and 134 of the user devices 104 and merchant devices 108 may include near field communication capabilities for performing the communications there between involved in POS operations.

In addition, and as mentioned previously, the computing device(s) 112 may include the one or more processor(s) 140, the computer-readable media 142 and network interface 144. The computing device(s) 112 may also include additional components not listed above that may perform any function associated with the computing device(s) 112. In various implementations, the computing device(s) 112 may be any type of computing device, such as a network-accessible server, and may be one of multiple servers included in a server cluster or server farm. In other implementations, the processor(s) 140 and the computer-readable media 142 of the computing device(s) 112 may be the same as, similar to, or different from the processor(s) 114 and the computer-readable media 116, respectively, of the user device(s) 104. As discussed above, the computer-readable media 142 may store the user interaction module 146, the merchant interaction module 148, the payment module 150, the open ticket module 152, and the database 154. The database 154 may store various information including user account information 156, merchant information 158, and open tickets 160.

The user interaction module 146 and merchant interaction module 148 operate to interface with the user devices 104 and merchant devices 108, respectively. For example, the modules 146 and 148 may operate in accordance with instructions from the payment module 150 to request or provide information on behalf of the payment module 150. The payment module 150 may handle the processing of payments. For example, the payment module 150 may utilize the user interaction module 146 and the merchant interaction module 148 to handle communication with the user 102 and merchant 106, respectively. In addition, the payment module 150 may utilize information from the database 154, such as the user account information 156 and merchant information 158 to provide handling of payments between merchants and users. In some implementations, user account information 156 may include information regarding electronic payment accounts of the customers (e.g. users 102).

As mentioned above, the payment module 150 may handle payments between merchants and users. When paying for a transaction, a user 102 can provide the amount of payment that is due to a merchant 106 using cash, check, a payment card, NFC, or by electronic payment through a payment service of the computing device(s) 112. The merchant 106 can interact with the merchant device 108 to process the transaction. In some examples, the service of the computing devise 112 may handle some payments while other payments may at least at times be handled by point of sale (POS) transactions. In such cases, the point of sale may be the place where the user 102 with user device 104 interacts with the merchant 106 with merchant device 108 and executes a transaction (e.g. purchases items from a street vendor merchant or a restaurant merchant). During point-of-sale (POS) transactions, the merchant device 108 can determine and send data describing the transactions, including, for example, services provided, item(s) being purchased, the amount of the services or item(s), buyer information, and so forth.

In some implementations, the payment service enables card-less payments, i.e., electronic payments, for transactions between the users 102 and the merchants 106 based on interaction of the user 102 with the user device 104 and interaction of the merchant 106 with the merchant device 108. Accordingly, in some examples, a card-less payment transaction may include a transaction conducted between a user 102 and a merchant 106 at a POS location during which an electronic payment account of the user 102 is charged without the user 102 having to physically present a payment card to the merchant 106 at the POS location. Consequently, the merchant 106 need not receive any details about the financial account of the user 102 for the transaction to be processed. As one example, the electronic payment may be charged to a credit card issuer or credit card number that the user 102 provided when signing up with the service of the computing device(s) 112 for an electronic payment account. As another example, the user 102 may have a quantity of money pre-paid in an account maintained for use in making the electronic payments. Other variations will also be apparent to those of skill in the art having the benefit of the disclosure herein.

Before conducting an electronic payment transaction, the user 102 typically creates a user account with the service of the computing device(s) 112. The user 102 can create the user account, for example, by interacting with an application of the user device 104 that is configured to perform electronic payment transactions and that may execute on the user device 104 (e.g. the payment service interface 122). When creating an electronic payment account with the service of the computing device(s) 112, the user 102 may provide an image including the face of the user, data describing a financial account of the user 102 (e.g., a credit card number, expiration date), and a billing address. This user information can be securely stored by the computing device(s) 112, for example, in the user account information 156 in the database 154. Further, the user account information 156 may be created for each user 102, which may include information about the user and transactions conducted by the user.

To accept electronic payments for POS transactions, the merchant 106 may create a merchant account with the service of the computing device(s) 112 by providing information describing the merchant including, for example, a merchant name, contact information, e.g., telephone numbers, the merchant's geographic location address, and one or more financial accounts to which funds collected from users will be deposited. This merchant information 158 can be securely stored by the service, for example, in the database 154 along with the user account information 156. Further, a merchant profile may be created for each merchant, which may include information about the merchant and transactions conducted by the merchant.

The service of the computing device(s) 112 may be configured to enable electronic payments for transactions. The computing device(s) 112 can include one or more servers that are configured to perform secure electronic financial transactions, e.g., electronic payments for transactions between a user and a merchant, for example, through data communicated between the user device 104 and the merchant device 108. Generally, when a user and a merchant enter into an electronic payment transaction, the transaction is processed by electronically transferring funds from a financial account associated with the user account to a financial account associated with the merchant account. Alternatively, the user may have a balance of funds maintained by the payment service as part of the user account which may be used in transactions.

The payment module 150 may be configured to send and receive data to and from the user device 104 and the merchant device 108. For example, the payment module 150 can be configured to send information describing merchants to an application on the user device 104 using, for example, the information stored in the database 154. For example, the payment module 150 can communicate data describing merchants 106 that are within a threshold geographic distance from a geographic location of the user device 104. The data describing the merchants 106 can include, for example, a merchant name, geographic location, contact information, and an electronic catalogue, e.g., a menu that describes items that are available from the merchant.

In some embodiments, the payment module 150 is configured to determine whether a geographic location of the user device 104 is within a threshold geographic distance from a geographic location of the merchant device 108. The payment module 150 can determine a geographic location of the user device 104 using, for example, geolocation data provided by the user device 104. Similarly, the payment module 150 can determine a geographic location of the merchant device 108 using, for example, geolocation data provided by the merchant device 108 or using a geographic address, e.g., street address, provided by the merchant. Depending on the implementation, the threshold geographic distance can be specified by the payment module 150, by the user, or by the merchant.

Determining whether the user device 104 is within a threshold geographic distance of the merchant device 108 can be accomplished in different ways including, for example, determining whether the user device 104 is within a threshold geographic radius of the merchant device 108, determining whether the user device 104 is within a particular geofence, or determining whether the user device 104 can communicate with the merchant device 108 using a specified wireless technology, e.g., Bluetooth® or Bluetooth® low energy (BLE). In some embodiments, the payment module 150 restricts electronic payment transactions between the user 102 and the merchant 106 to situations where the geographic location of the user device 104 is within a threshold geographic distance from a geographic location of the merchant device 108.

The computing device(s) 112 can also be configured to communicate with one or more card payment network computing devices(s) 162 of a card payment network (e.g., MasterCard®, VISA®) over the one or more networks 110 to conduct financial transactions electronically. The computing device(s) 112 can also communicate with one or more bank computing devices 164 of one or more banks over the one or more networks 110. For example, the computing device(s) 112 may communicate with an acquiring bank, and/or an issuing bank, and/or a bank maintaining user accounts for electronic payments.

An acquiring bank may be a registered member of a card association (e.g., Visa®, MasterCard®), and may be part of a card payment network. An issuing bank may issue payment cards to users, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the user may use a debit card or gift card instead of a credit card, in which case, the bank computing device(s) of a bank or other institution corresponding to the debit card or gift card may receive communications regarding a transaction in which the user is participating. Additionally, there may be computing devices of other financial institutions involved in some types of transactions or in alternative system architectures, and thus, the foregoing are merely several examples for discussion purposes. In addition, the merchant device(s) 108 may perform interactions similar to those described above with regard to the card payment network computing devices(s) 162 of a card payment network and the bank computing devices 164 when processing transactions for payment instruments that do not involve the payment service of the computing device(s) 112.

The user 102 operating the user device 104 that is within a threshold geographic distance of the merchant device 108 can interact with an application executed on the user device 104 to conduct an electronic payment transaction with the merchant 106. While interacting with the application, the user 102 can select the merchant 106, from a listing of merchants 106, with whom the user wants to enter into an electronic payment transaction. The user 102 can select the merchant 106, for example, by selecting a "check in" option associated with the merchant 106. The user device 104 can communicate data to the computing device(s) 112 indicating that the user 102 has checked in with the merchant 106. In response, the computing device(s) 112 can communicate data to notify the merchant device 108 that the user has checked in. An application executing on the merchant device 108 can notify the merchant 106 that the user has electronically checked in with the merchant 106 through a display of the merchant device 108.

Once checked in, the user 102 can receive, obtain or request items, services or appointments that are available to be acquired from the merchant 106. When the user 102 is ready to enter into the card-less payment transaction, the user 102 can, for example, approach a point of sale for the merchant 106 and identify him or herself. For example, the user 102 can verbally notify the merchant 106 that the user 102 wants to enter into a card-less payment transaction and can provide the merchant 106 with the user's name. The merchant 106 can then interact with the application executing on the merchant's device to select the user 102, from a listing of users that have checked in with the merchant 106, to initiate an electronic payment transaction for the item(s) being acquired by the user 102. For example, the merchant 106 can determine a total amount to charge the user for the item(s) being acquired. The user can verbally approve the total amount to be paid and, in response, the merchant 106 can submit a request for an electronic payment transaction for the total amount of the transaction to the computing device(s) 112. In response, the computing device(s) 112 can obtain, for example, from the user account information 156, data describing a financial account associated with the electronic purchase account of the user 102 to which the total amount will be charged.

The computing device(s) 112 can then communicate with the card payment network computing devices(s) 162 of a card payment network to complete an electronic payment transaction for the total amount to be charged to user's electronic payment account. Once the electronic payment transaction is complete, the computing device(s) 112 can communicate data describing the electronic payment for the transaction to the user device 104, e.g., as an electronic receipt, which can, for example, notify the user 102 of the total amount charged to the user for the electronic payment for the transaction with the particular merchant. Further, while a mobile user device 104 is described in this example for purposes of explanation, additional or alternative types of devices may be used in other examples.

In some examples, a merchant 106 can utilize a merchant device 108 (e.g., a POS device) to conduct transactions with user(s) 102. For instance, the merchant 106 can input data associated with the transactions into the merchant device 108. The input can include identities of the user(s) 102, personal information associated with the user(s) 102 (e.g., contact information, addresses, etc.), locations of the user(s) 102 within a physical establishment of the merchant 106 (e.g., restaurant area, bar area, waiting area, patio area, etc.), orders made by the user(s) 102 during a course of the transactions with the merchant 106, or the like. Based on the input, the merchant device 108 can generate open tickets for the transactions between the merchant 106 and the user(s) 102.

In some examples, an open ticket is a data structure that stores information associated with interactions between the merchant 106 and user(s) 102 during a course of a transaction. The interactions can include an identity of the merchant 106, a location of the merchant 106, identities of the user(s) 102, the personal information associated with the user(s) 102, the locations of the user(s) 102 within the physical establishment of the merchant 106, the items order by the user(s) 102 during the transaction (e.g., cart information), timestamps for each of the items ordered by the user(s) 102 during the transaction, a cost associated with each of the items, a cost associated with the open ticket, or other information associated with the transaction. After creating the open tickets, and during the course of the transactions, the merchant device 108 can further update the data structures for the open tickets. For instance, the merchant device 108 can add (e.g., store) additional information associated with interactions between the merchant 106 and the user(s) 102 to the data structures.

In some examples, the open ticket data structures further include associated versioning data structures that the merchant device 108 uses to when synchronizing open tickets with other merchant devices 108 (e.g., a second POS device). For instance, an associated versioning data structure for an open ticket data structure can include a vector that indicates each time the open ticket data structure is updated by the merchant device 108 (and/or any other of the merchant device(s) 108). For instance, when an open ticket data structure is first created, the merchant device 108 may cause the vector of the versioning data structure to include a count of one. The merchant device 108 can then increase the count of the vector each time the merchant device 108 updates the open ticket.

Open ticket data structures described herein may be generated, maintained, and/or synchronized using some or all of the techniques described in U.S. patent application Ser. No. 14/686,381, filed on Apr. 14, 2015 and issued on Feb. 14, 2017 as U.S. Pat. No. 9,569,757, entitled "Open Ticket Payment Handling with Offline Mode", and U.S. patent application Ser. No. 14/871,776, filed on Sep. 30, 2015 and issued on Dec. 4, 2018 as U.S. Pat. No. 10,147,079, entitled "Anticipatory Creation of Point-Of-Sale Structures," which are incorporated herein by reference in its entirety.

In some examples, the merchant device 108 can generate the open tickets using predefined ticket templates (e.g., predefined types of tickets). Predefined ticket templates can define which elements are included within open tickets. For instance, a predefined ticket template can define which graphics, text, interactive elements, or the like are included within an open ticket. The predefined ticket templates can further define a layout for the elements within the open tickets. For instance, the predefined ticket template above can define a layout for the graphics, text, interactive elements, or the like. In some examples, the merchant device 108 selects which predefined ticket template to use for an open ticket of a transaction based on a type of transaction that the merchant is conducting with the user(s) 102.

For instance, the merchant device 108 can associate predefined ticket templates with various types of transactions. Types of transactions can include transactions that occur at the physical establishment of the merchant 106 and/or transactions that occur outside of the physical establishment of the merchant 106. At the physical establishment of the merchant 106, types of transaction can be based zones/stations within the physical establishment of the merchant 106. For instance, in some examples, the types of transactions can include restaurant area transactions, bar area transactions, waiting area transactions, patio area transactions, or the like. Outside of the physical establishment of the merchant 106, types of merchants can include delivery type transactions.

To generate open tickets using the predefined ticket templates, the merchant device 108 identifies the type of transaction that is being conducted between the merchant 106 and user(s) 102. For instance, the merchant device 108 can receive input associated with a transaction between the merchant 106 and user(s) 102. In some examples, the input can indicate the type of transaction that is being conducted between the merchant 106 and the user(s) 102. Additionally or alternatively, in some examples, the input can indicate a group (e.g., the zone/station) associated with the user(s) 102. In such examples, the merchant device 108 can determine the type of transaction based on the group. The merchant device 108 can then select a predefined ticket template for the transaction based on the association between the predefined ticket template and the identified type of transaction. Using the predefined ticket template, the POS device can then generate an open ticket for the transaction between the merchant 106 and the user(s) 102.

In some examples, the merchant device 108 can further associated transaction flows with the open tickets. Transaction flows can define one or more process(es) that the merchant 106 is to perform during a transaction with the user(s) 102. For instance, a transaction flow can include various steps associated with the transaction, such as when to input data associated with the user(s) 102, when to input data associated with orders made by the user(s) 102, when to process the transaction, whether to provide the user(s) 102 with a physical and/or digital receipt, or the like. In some examples, the merchant device 108 selects a transaction flow for an open ticket based on the predefined ticket template that the merchant device 108 uses when generating the open ticket.

After generating the open ticket, the merchant device 108 can present the open ticket to the merchant 106. For instance, the merchant device 108 can generate a visual representation of data associated with the open ticket, and present the visual representation of the data via the display 132. In some examples, a layout of data associated with the open ticket is based on the predefined ticket template and/or the transaction flow. For instance, the elements within the visual representation include the layout defined by the predefined ticket template. Additionally, any messages and/or alerts associated with the process(es) for the transaction flow are provided to the merchant 106 via the visual representation.

In some examples, the merchant 106 can then utilize the visual representation during the course of the transaction with the user(s) 102. For instance, in some examples, the merchant 106 can utilize the visual representation to add additional orders made by the user(s) 102 to the open ticket. To add additional orders, the merchant device 108 can receive input associated with the orders from the merchant 106, such as indications of items ordered by the user(s) 102. The merchant device 108 can then add data associated with the orders to the open ticket data structure of the open ticket. In some examples, the merchant device 108 can further update the associated versioning data structure for the open ticket data structure in to order to indicate that the open ticket was updated. Additionally, the merchant device 108 can update the visual representation of the open ticket based on the order.

In some examples, the merchant 106 can further utilize the visual representation to merge the open ticket with an additional open ticket. Merging the open ticket with the additional open ticket can include merging the information from the open ticket data structure of the open ticket with information from the open ticket data structure of the additional open ticket in order to generate a merged open ticket data structure. For instance, the merged open ticket data structure can include the identity of the merchant 106, a location of the merchant 106, identities of the user(s) 102 of the open tickets, the personal information associated with the user(s) 102 of the open tickets, the locations of the user(s) 102 within the physical establishment of the merchant 106, the items order by the user(s) 102 during the transactions (e.g., cart information), timestamps for each of the items ordered by the user(s) 102 during the transaction, a cost associated with each of the items, a cost associated with the merged open ticket, or other information associated with the transactions. The merchant device 108 can then generate a new visual representation of data associated with the merged open ticket, and present the new visual representation of the data via the display device.

In some examples, the merchant 106 can further utilize the visual representation to modify the type of transaction associated with the transaction. For instance, the merchant device 108 can receive input identifying a new type of transaction for the transaction between the merchant 106 and the user(s) 102. The merchant device 108 can then select (and/or determine) a new predetermined ticket template associated with the new type of transaction. Using the new predetermine ticket template, the merchant device 108 can update the open ticket for the transaction in order to generate a new open ticket. The merchant device 108 can then select (and/or determine) a new transaction flow for the new open ticket, and associated the new transaction flow with the new open ticket. After generating the new open ticket, the merchant device 108 can generate a new visual representation of data associated with the new open ticket, and present the new visual representation of the data via the display device.

It should be noted that, in some examples, the computing device(s) 112 can generate the open tickets 160 for the merchant 106 using a similar process as the merchant device 108 above. For instance, the computing device(s) 112 can receive, from a merchant device 108, data associated with the transactions between the merchant 106 and the user(s) 102. The computing device(s) 112 can then use the data to identify a types of transactions for the transactions between the merchant 106 and the user(s) 112. Based on the identified types of transactions, computing device(s) 112 can utilize the open ticket module 152 to generate open tickets 160 for the transactions using predefined ticket templates. The computing device(s) 112 can further associate transaction flows with the open tickets 160. After generating the open tickets 160, the computing device(s) 112 can send data associated with the open tickets 160 to the merchant device(s) 108.

It should further be noted that, in some examples, the merchant device 108 and/or the computing device(s) 112 can further synchronize data associated with open tickets. For instance, each time a merchant device 108 updates an open ticket, the merchant device 108 can send data associated with the update to the other merchant device(s) 108 and/or the computing device(s) 112. When synchronizing the data for the open tickets, the merchant device(s) 108 and/or the computing device(s) 112 can use the associated versioning data structures for the open tickets, as described above.

Figure 2:
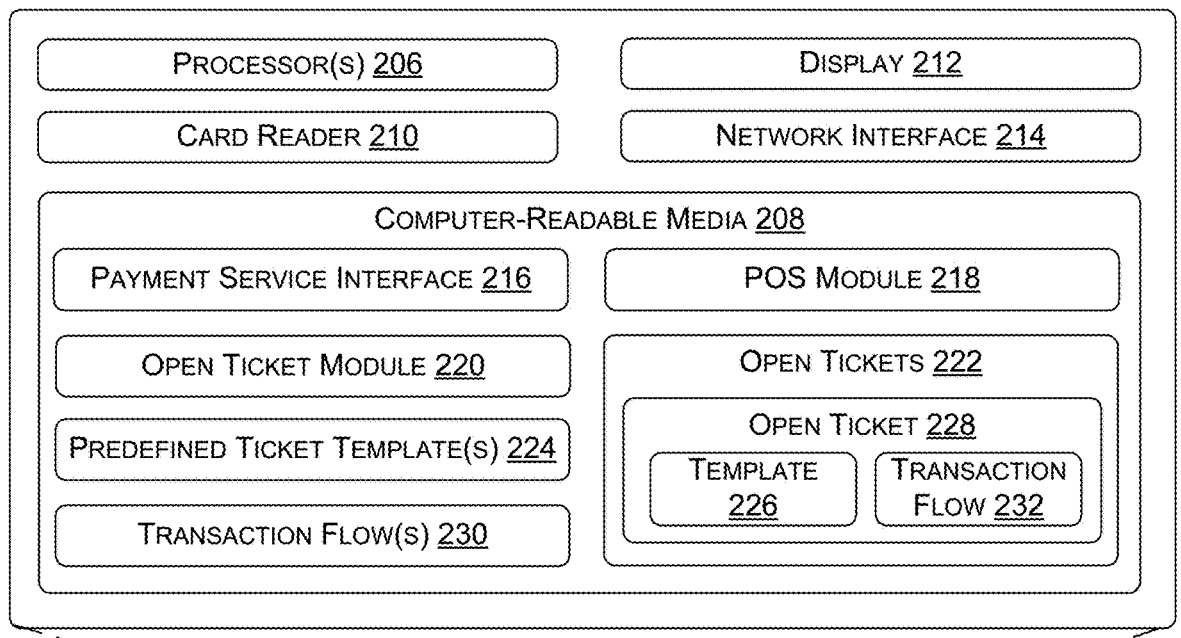
FIG. 2 is an example illustration of merchant devices integrating predefined templates with open ticket functionality. In the example of FIG. 2, the merchant devices then synchronize data associated with generated open tickets.
Figure 2:
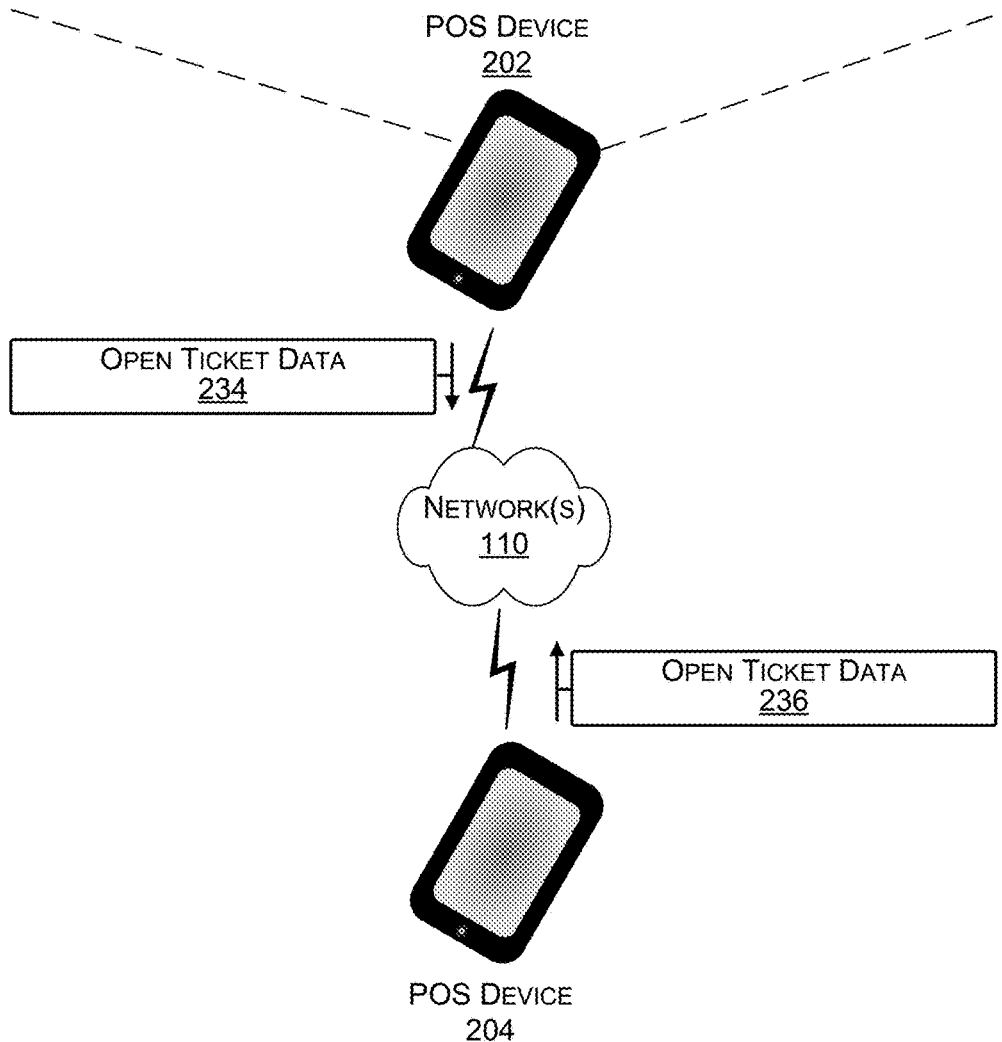

FIG. 2 is an example illustration of merchant devices integrating predefined templates with open ticket functionality. For instance, a first point-of-sale (POS) device 202 and second POS device 204 can generate open tickets using predefined ticket templates and/or transaction flows. In some examples, the first POS device 202 and the second POS device 204 can each represent one of merchant device(s) 108. For instance, the processor(s) 206, the computer-readable media 208, the card reader 210, the display 212, the network interface 214, the payment service interface 216, and the POS module 218 of the first merchant device 202 can represent the processor(s) 126, the computer-readable media 128, the card reader 130, the display 132, the network interface 134, the payment service interface 136, and the POS module 138, respectively. Also, in some examples, the second POS device 204 can include one or more of the components 206-232 of the first POS device 202.

In the example of FIG. 2, the first POS device 202 can use the open ticket module 220 to generate open tickets 222 for transactions. For instance, a merchant (e.g., one of merchant(s) 106) can input data associated with the transactions into the first POS device 202. The input can include identities of customers (e.g., user(s) 102) associated with the transactions, personal information associated with the customers (e.g., contact information, addresses, etc.), locations of the customers within a physical establishment of the merchant (e.g., stations/zones within the physical establishment, such as restaurant area, bar area, waiting area, patio area, etc.), orders made by the customers during a course of the transactions with the merchant, or the like. Based on the input, the first POS device 202 can utilize the open ticket module 152 to generate the open tickets 222 for the transactions.

As discussed above, open tickets 222 are data structures that store information associated with interactions between the merchant and the customers during a course of the transactions. In some examples, the open tickets 222 further include associated versioning data structures that the first POS device 202 uses when synchronizing the open tickets 222 with other merchant devices, such as the second POS device 204. After creating the open tickets 222, and during the course of the transactions, the first POS device 202 can further update the data structures for the open tickets 222. For instance, the first POS device 202 can add (e.g., store) additional information associated with interactions between the merchant and the customers to the data structures.

In the example of FIG. 2, the first POS device 202 can generate the open tickets 222 using predefined ticket template(s) 224. In some examples, the predefined ticket template(s) 224 can define which elements are included within the open tickets 222. For instance, the predefined ticket template(s) 224 can define which graphics, text, interactive elements, or the like are included within the open tickets 222. Additionally, the predefined ticket template(s) 224 can define a layout for the elements within the open tickets 222. For instance, the predefined ticket template(s) 224 can define the layout (e.g., the locations) for the graphics, text, interactive elements, or the like within the open tickets 222. In some examples, the first POS device 202 selects which predefined ticket template(s) 224 to utilize when generating open tickets 222 based on types of transactions that the merchant is conducting with customers.

For instance, the first POS device 202 can associate the predefined ticket template(s) 224 with various types of transactions. Types of transactions can include transactions that occur at the physical establishment of the merchant and/or transactions that occur outside of the physical establishment of the merchant. At the physical establishment of the merchant, types of transaction can be based zones/stations (e.g., groups) within the physical establishment of the merchant. For instance, in some examples, the types of transactions can include restaurant area transactions, bar area transactions, waiting area transactions, patio area transactions, or the like. Outside of the physical establishment of the merchant, types of merchants can include delivery type transactions.

To select a predefined ticket template 226 (from the predefined ticket templates(s) 224) for an open ticket 228 of the open tickets 222, the first POS device 202 identifies the type of transaction that is being conducted between the merchant and a customer. For instance, the first POS device 202 can receive input associated with the transaction between the merchant and the customer. In some examples, the input can indicate the type of transaction that is being conducted between the merchant and the customer. For instance, the input can indicate that the type of transaction includes a restaurant area type of transaction. Additionally or alternatively, in some examples, the input can indicate a group (e.g., a zone/station within the physical establishment) associated with the customer. For instance, the input can indicate that the customer is located within the restaurant area of the physical establishment of the merchant. The first POS device 202 can then determine the type of transaction based on the group.

After identifying the type of transaction, the first POS device 202 selects the predefined ticket template 226 for the transaction. For instance, the first POS device 202 can determine that the predefined ticket template 226 is associated with the identified type of transaction using the association between the predefined ticket template 226 and the identified type of transaction. Based on the determination, the first POS device 202 can select the predetermined ticket template 226 from the predefined ticket template(s) 224.

After selecting the predefined ticket template 226, the first POS device 202 generates the open ticket 228 using the predefined ticket template 226. For instance, the first POS device 202 uses the predefined ticket template 226 to determine which elements to include in the open ticket 228. The elements can include graphics, text, interactive elements, or the like. The first POS device 202 then uses the predefined ticket template 226 to determine a layout for the elements within the open ticket 228. For instance, the layout can define a location for each of the elements within the open ticket 228. In some examples, the first POS device 202 then generates the open ticket 228 based on the elements, the layout, and data input by the merchant that is associated with the transaction. For instance, the first POS device 202 can utilize the elements and/or the layout for the elements within the open ticket 228 in order to place the data received from the merchant within the open ticket 228.

For examples, the predefined ticket template 226 and/or the transaction flow 232 for the open ticket 228 can define the layout of elements of the open ticket 228 to include a first text portion at a top portion of the open ticket 228 that includes general information about the merchant, a second text portion in a middle portion of the open ticket 228 that includes a list of items, an interactive element below the list of items for adding additional items to the open ticket 228, and an interactive element at a bottom portion of the open ticket 228 for processing the open ticket 228. In such an examples, the first POS device 202 can generate the layout of the elements for the open ticket 228. The first POS device 202 can then add text to the first text portion and the second text portion based on input that the first POS device 202 receives from the merchant.

In some examples, the first POS device 202 can further associate transaction flow(s) 230 with the open tickets 222. Transaction flow(s) 230 can include metadata indicating one or more process(es) that the merchant is to perform during transactions with the customers. For instance, each of the transaction flow(s) 230 can include data indicating various steps associated with a respective transaction, such as when to input data associated with the customers of the respective transaction, when to input data associated with orders made by the customers of the respective transaction, when to process the respective transaction, whether to provide a digital and/or printed receipt to the customers, or the like. In some examples, the transaction flow(s) 230 cause the first POS device 202 to provide messages and/or alerts to the merchant based on the process(es) that the merchant is to perform during the transactions.

For instance, at the start of transaction, a transaction flow 230 can cause the first POS device 202 to present a message to the merchant notifying the merchant to input information associated with a customer of the transaction. In some examples, the transaction flow can further cause the first POS device to provide an interactive element on an open ticket 222 of the transaction that the merchant can use to input the information about the customer. Next, during the transaction, the transaction flow 230 can cause the first POS device to present a message to the merchant notifying the merchant to input data associated with a customer order. Additionally, in some examples, the transaction flow 230 can cause the first POS device to provide an interactive element on the open ticket 222 of the transaction that the merchant can use to input the data. The transaction flow 230 can then continue to provide the merchant with messages, during a course of the transaction, that notify the merchant of processes to take with the customer.

In some examples, the first POS device 202 selects the transaction flow(s) 230 for the open tickets 222 based on the predefined ticket template(s) 224 that the first POS device 202 uses when generating the open tickets 222. For instance, the first POS device 202 can associate each of the transaction flow(s) 230 with one or more of the predefined ticket template(s) 224. In some examples, the associations between the transaction flow(s) 230 and the predefined ticket template(s) 224 are based on the types of transactions. For instance, a transaction flow 230 that defines one or more process(es) that the merchant is to perform during a restaurant area type of transaction can be associated with the predefined ticket template(s) 224 that the merchant associates with restaurant area types of transactions. The first POS device 202 can then use the associations between the transaction flow(s) 230 and the predefined ticket template(s) 224 when selecting transaction flow(s) 230 for open tickets 222.

For instance, in the example of FIG. 2, the first POS device 202 can determine that the open ticket module 220 generated the open ticket 228 using the predefined ticket template 226. Based on the determination, the first POS device 202 can determine that the transaction flow 232 from the transaction flow(s) 230 is associated with the predefined ticket template 226. In response, the first POS device can then select the transaction flow for the open ticket 228. The first POS device 202 can further associate the transaction flow 232 with the open ticket 228.

After generating the open tickets 222, the first POS device 202 can present the open tickets 222 to the merchant via the display 212. For instance, in the example of FIG. 2, the first POS device 202 can generate a visual representation of data associated with the open ticket 228. The first POS device 202 can then present the visual representation of the data via the display 212. In some examples, a layout of the data associated with the visual representation is based on the predefined ticket template 226 and/or the transaction flow 232. For instance, the elements within the visual representation include the layout defined by the predefined ticket template 226. Additionally, any messages and/or alerts associated with the process(es) for the transaction flow 232 are provided to the merchant via the visual representation.

For example, the transaction flow 232 for open ticket 228 may indicate that a process for the transaction includes inputting data associated with the customer (e.g., an address) at a beginning of the transaction. Based on the transaction flow 232, the first POS device 202 can provide a message on the visual representation that notifies the merchant to input the data. The first POS device 202 can further present an interactive element on the visual representation that the merchant can utilize to input the information.

For another example, the transaction flow 232 for the open ticket 228 can indicate that a process for the transaction includes asking the customer if he/she would like another drink every ten minutes. Based on the transaction flow 232, the first POS device 202 can provide an alert on the visual representation every ten minutes when the first POS device 202 does not receive input associated with drink orders for the transaction. The alert can notify the merchant that the merchant is to ask the customer if he/she would like another drink. The first POS device 202 can further present an interactive element on the visual representation that the merchant can utilize to input the drink orders for the customer.

In some examples, the merchant can utilize the visual representation during the course of the transaction with the customer. For instance, in some examples, the merchant can utilize the visual representation to add additional orders made by the customer to the open ticket 228. To add additional orders, the first POS device 202 can receive input associated with the orders from the merchant. The input can indicate one or more items ordered by the customer from the merchant. The first POS device 202 can then add data associated with the orders to the open ticket 228. Additionally, the first POS device 202 can update the visual representation of the open ticket 228 based on the order. For instance, the first POS device 202 can add indications associated with the one or more items ordered by the customer to the visual representation.

In some examples, the merchant can further utilize the visual representation to merge the open ticket 228 with an additional open ticket. Merging the open ticket 228 with the additional open ticket can include merging the information from the open ticket data structure of the open ticket 228 with information from the open ticket data structure of the additional open ticket in order to generate a merged open ticket data structure. The first POS device 202 can then generate a new visual representation of data associated with the merged open ticket, and present the new visual representation of the data via the display 212.

In some examples, the merchant can further utilize the visual representation to modify the type of transaction associated with the transaction. For instance, the first POS device 202 can receive input identifying a new type of transaction for the transaction between the merchant and the customer. The first POS device 202 can then select a new predetermined ticket template 224 associated with the new type of transaction. Using the new predetermine ticket template 224, the first POS device 202 can update the open ticket 228 for the transaction in order to generate a new open ticket. The first POS device 202 can then select a new transaction flow 230 for the new open ticket, and associated the new transaction flow 230 with the new open ticket. After generating the new open ticket, the first POS device 202 can generate a new visual representation of data associated with the new open ticket, and present the new visual representation of the data via the display 212.

Also illustrated in the example of FIG. 2, the first POS device 202 and the second POS device 204 can synchronize open tickets 222. For instance, the first POS device 202 can send open ticket data 234 to the second POS device 204. The open ticket data 234 can include data associated with one or more of the open tickets 222. In some examples, the first POS device 202 sends the open ticket data 234 to the second POS device 204 each time the first POS device 202 updates one of the open tickets 222. In some examples, the first POS device 202 sends the open ticket data 234 to the second POS device 204 at given time intervals. For instance, the first POS device 202 can send the open ticket data 234 to the second POS device 204 every second, five seconds, minute, or the like.

Additionally, the second POS device 204 can send open ticket data 236 to the first POS device 202. The open ticket data 236 can include data associated with one or more of the open tickets stored on the second POS device 204 (which can include open tickets 222). In some examples, the second POS device 204 sends the open ticket data 236 to the first POS device 202 each time the second POS device 204 updates one of the open tickets. In some examples, the second POS device 204 sends the open ticket data 236 to the first POS device 202 at given time intervals. For instance, the second POS device 204 can send the open ticket data 236 to the first POS device 202 every second, five seconds, minute, or the like.

In some examples, the first POS device 202 and the second POS device 204 use associated versioning data structures for open tickets when performing the synchronization. For instance, the first POS device 202 and/or the second POS device 204 can update the associated versioning data structure of an open ticket each time the first POS device 202 and/or the second POS device updates the open ticket. By updating the associated versioning data structure, the POS device that did not perform the updating can determine that the open ticket was updated by another POS device based on the associated versioning data structure.

It should further be noted that, in some examples, the first POS device 202 can select predefined ticket template(s) 224 for open tickets 222 using customer profiles (e.g., user account information 156). For instance, the first POS device 202 can store information associated with a customer in a customer profile. The information can include an identity of the customer, contact information associated with the customers, items that the customer ordered from the merchant in previous transactions, payment information associated with the customer, or the like. The first POS device 202 can then use the customer profile to determine a type of transaction that the customer prefers when conducting transactions with the merchant. Based on the type of transaction, the first POS device 202 can create an open ticket for the transaction using the processes above.

Figure 3:
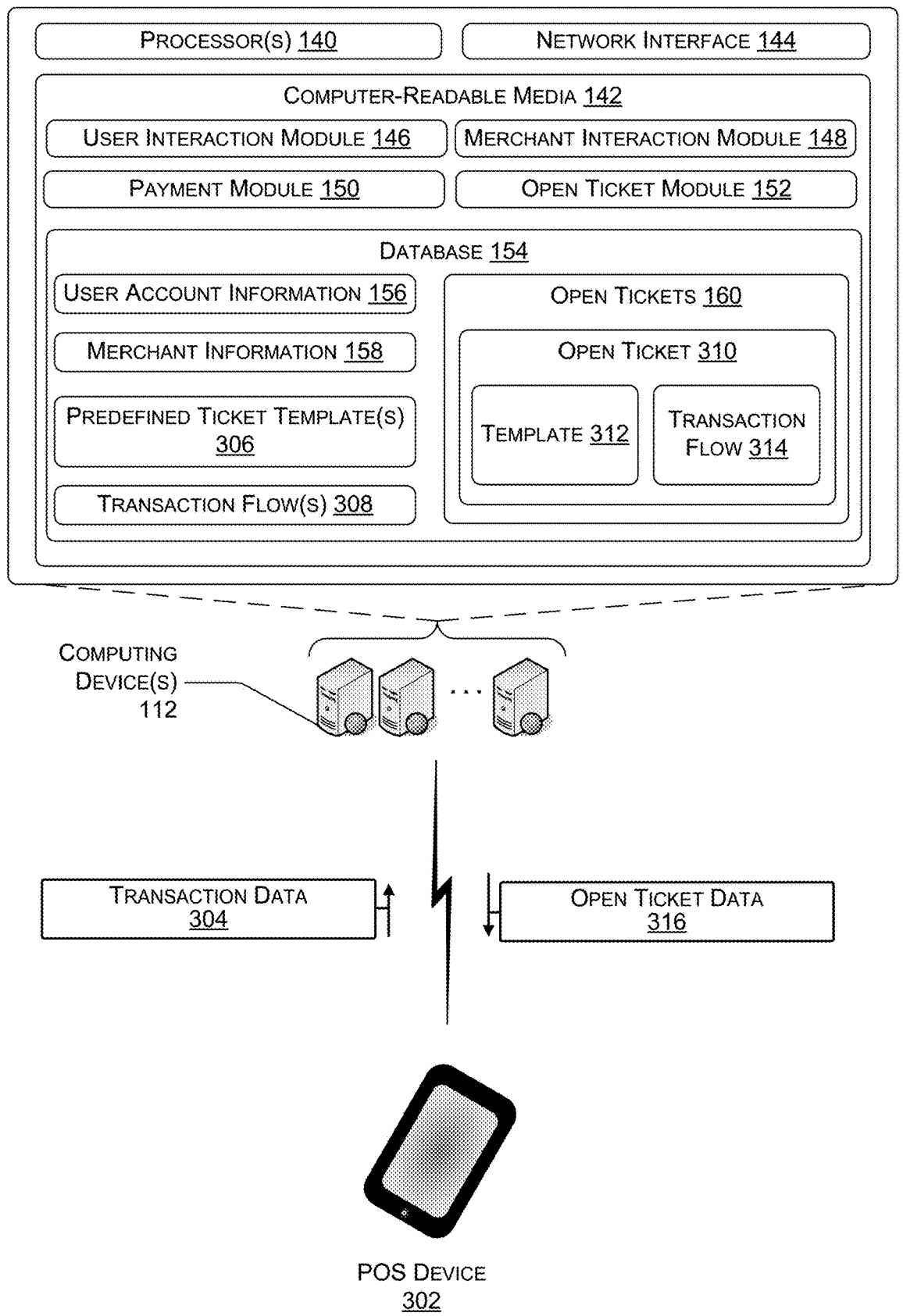
FIG. 3 is an example illustration of a third-party service integrating predefined templates with open ticket functionality for merchant devices.

FIG. 3 is an example illustration of a third-party service integrating predefined templates with open ticket functionality for merchant devices. In the example of FIG. 3, a POS device 302 can utilize the computing device(s) 112 to generate open tickets for transactions between a merchant and customers. In some examples, the POS device 302 can represent one of merchant device(s) 108. In some examples, the computing device(s) 112 processes transactions for the merchant. In some examples, the computing device(s) 112 may include a service that only generates open tickets 160 for the merchant.

In the example of FIG. 3, the POS device 302 can receive input corresponding to customer orders associated with transactions between the merchant and customers. Based on receiving the input, the POS device 302 can send transactional data 304 associated with the transactions to the computing device(s) 112. The transactional data 304 can include data indicating an identity of the merchant, a location of the merchant, identities of the customers associated with the transaction, the personal information associated with the customers, the locations of the customers within the physical establishment of the merchant, the items order by the customers during a course of the transactions (e.g., cart information), timestamps for each of the items ordered by the customers during the course of the transactions, a cost associated with each of the items, or other information associated with the transactions. In some examples, the POS device 302 sends the computing device(s) 112 transaction data 304 for the transactions each time the POS device 302 receives input associated with one of the transactions. Additionally or alternatively, in some examples, the POS device 302 sends the computing device(s) 112 transaction data 304 at given time intervals, such as every second, minute, five minutes, or the like.

The computing device(s) 112 can receive the transactional data 304 from the POS device 302. After receiving the transaction data 304, the computing device(s) 112 utilize the open ticket module 152 to generate the open tickets 160 (which can represent the open tickets 222) for the transactions using the transactional data 304. For instance, the computing device(s) 112 can generate open tickets 160 for the transactions using a similar process as the first POS device 202 generating the open tickets 222 as described above.

For instance, in the example of FIG. 3, the computing device(s) 112 can generate the open tickets 160 using predefined ticket template(s) 306, which can represent predefined ticket template(s) 224. When generating the open tickets 160 using the predefined ticket templates(s) 306, the computing device(s) 112 can determine and/or select predefined ticket template(s) 306 for the open tickets 160 using an association between the predefined ticket templates(s)

306 and types of transactions being conducted by the merchant. In some examples, the computing device(s) 112 can further associate transaction flow(s) 308 with the open tickets 160, where the transaction flow(s) 308 can represent the transaction flow(s) 230. For instance, the computing device(s) 112 can determine and/or select transaction flow(s) 308 for open tickets 160 using associations between the transaction flow(s) 308 and the predefined ticket template(s) 306.

For instance, in the example of FIG. 3, the computing device(s) 112 can generate an open ticket 310 for a transaction between the merchant and a customer. To generate the open ticket 310, the computing device(s) 112 can determine a type of transaction for the transaction using the transaction data 304. For instance, in some examples, the transaction data 304 can indicate that the type of transaction includes a restaurant area type of transaction. Additionally or alternatively, in some examples, the transaction data 304 can indicate that the customer is associated with the restaurant area group, and the computing device(s) 112 can determine that the type of transaction includes a restaurant area type of transaction based on the group. The computing device(s) 112 can then use the type of transaction to select the predefined ticket template 312 from the predefined ticket template(s) 306 for the open ticket 310.

After selecting the predefined ticket template 312, the computing device(s) 112 can utilize the open ticket module 152 to generate the open ticket 310 using the predefined ticket template 312. In some example, the computing device(s) 112 can further select, based on the predefined ticket template 312, a transaction flow 314 from the transaction flow(s) 308 for the open ticket 310. For instance, the computing device(s) 112 can determine that the transaction flow 31 is associated with the predefined ticket template 312. Based on the association, the computing device(s) 112 can select the transaction flow 314 from the transaction flow(s) 308. The computing device(s) 112 can then associate the transaction flow 314 with the open ticket 310.

In the example of FIG. 3, the computing device(s) 112 can send open ticket data 316 to the POS device 302. The open ticket data 316 can include data associated with one or more of the open tickets 160. For instance, the open ticket data 316 can include data indicating identities of the open tickets 160, identities of the customers associated with the open tickets 160, the personal information associated with the customers, the locations of the customers within the physical establishment of the merchant, the items order by the customers during a course of the transactions (e.g., cart information), timestamps for each of the items ordered by the customers during the course of the transactions, a cost associated with each of the items, or other information associated with the transactions. In some examples, the POS device 302 can use the open ticket data 316 to generate visual representations of one or more of the open tickets 160. The POS device 302 can then display the visual representations of the one or more open tickets 160 to the merchant.

It should be noted that, in some examples, the POS device 302 can continue to send the computing device(s) 112 transaction data 304 associated with transactions between the merchant and customers. For instance, each time the POS device 302 receives input associated with a transaction, the POS device 302 can send the computing device(s) 112 transaction data 304 associated with the input. In some examples, the input can include additional customer orders for the transaction, a request to merge an open ticket 310 for the transaction with another open ticket, an indication that a type of transaction for the transaction has changed, or the like. The computing device(s) 112 can use the transaction data 304 from the POS device 302 to update the open ticket 310 for the merchant using a similar process as the POS device 202 above.

Additionally, it should be noted that, in some examples, the computing device(s) 112 can synchronize open tickets 160 with additional merchant devices (e.g., POS device) associated with the merchant. For instance, the computing device(s) 112 can receive transaction data associated with transactions from one or more additional merchant devices. Using the transaction data, the computing device(s) 112 can generate open tickets 160 for the transactions. The computing device(s) 112 can then send open ticket data associated with the open tickets 160 to the POS device 302 and/or to the one or more additional merchant devices.

Figure 4:
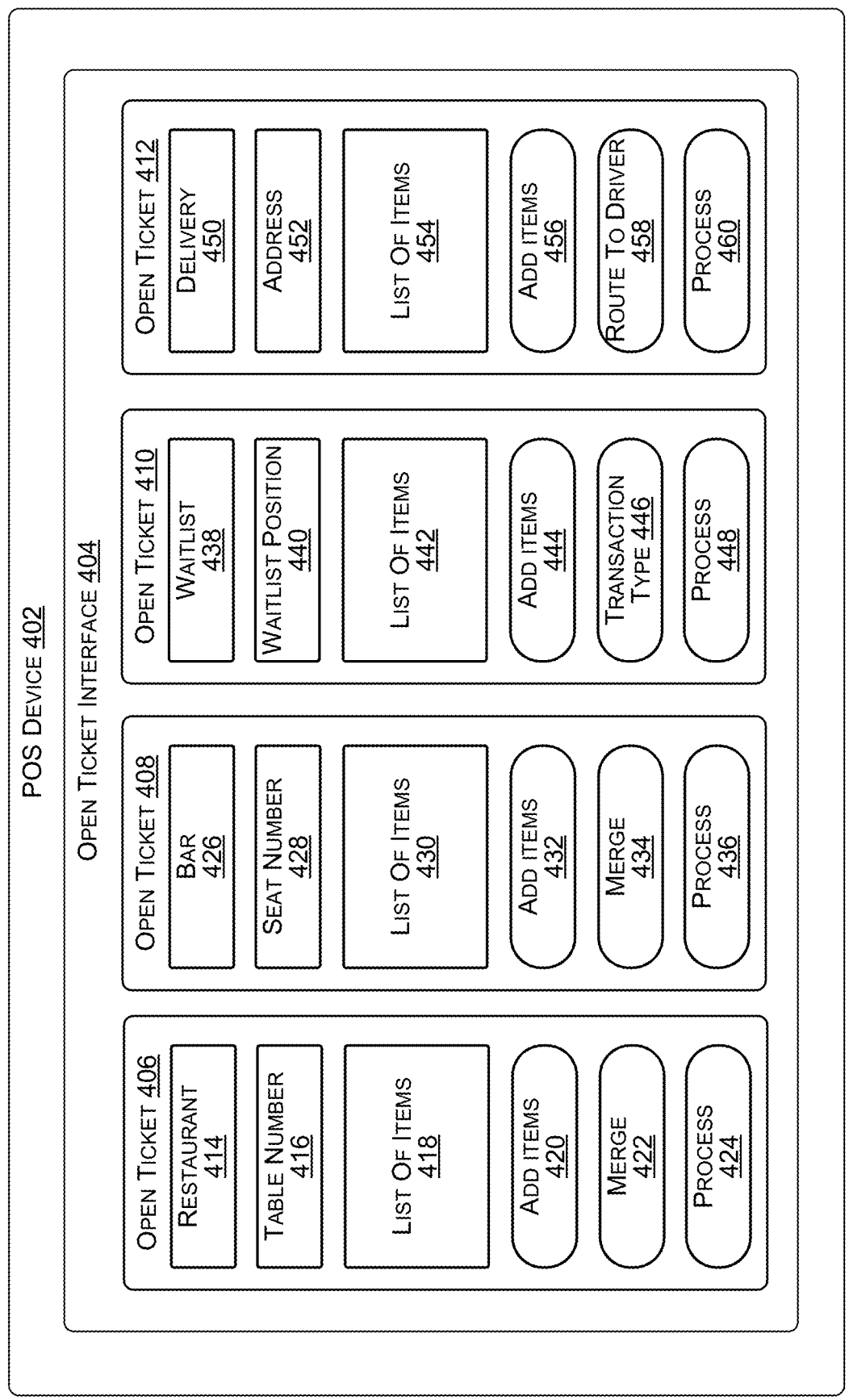
FIG. 4 is an example illustration of open tickets that were generated using predefined templates and/or transaction flows.

FIG. 4 is an example illustration of open tickets that were generated using predefined templates and/or transaction flows. For instance, in the examples of FIG. 4, a POS device 402, which can represent one of merchant device(s) 108, is presenting an open ticket interface 404 (which can represent the payment service interface 136) to the merchant. The open ticket interface 404 includes visual representation of four open tickets 406-412. In some examples, each of the open tickets 406-412 can correspond to a respective transaction between the merchant and a customer.

For instance, the first open ticket 406 can include a restaurant area 414 type of transaction between the merchant and a first customer. As illustrated in FIG. 4, elements included in the first open ticket 406 for the restaurant area 414 type of transaction include a table number 416, a list of items 418, an interactive add items 420 button, an interactive merge 422 tickets button, and an interactive process 424 the transaction button.

The table number 416 can include text indicating a table that the first customer is seated at within the restaurant area of the physical establishment of the merchant. For instance, the table number 416 can indicate that the first customer is seated at table five. The list of items 418 can indicate one or more items ordered by the first customer during a course of the transaction. The interactive add items 420 button can include an interactive element of the first open ticket 406 that the merchant can select to add additional items to the first open ticket 406. The interactive merge 422 button can include an interactive element of the first open ticket 406 that the merchant can select to merge the first open ticket 406 with one or more additional open tickets (e.g., open tickets 408-412). Finally, the interactive process 424 transaction button can include an interactive element of the first open ticket 406 that the merchant can select to process the first open ticket 406 at the end of the transaction.

In some examples, a predefined ticket template and/or the transaction flow for the first open ticket 406 can configure the first open ticket 406 to include the elements 414-424. For instance, the predefined ticket template for the first open ticket 606 can define that the first open ticket 406 includes text indicating the restaurant area 414 type of transaction, the table number 416, and the list of items 418. Additionally, the predefined ticket template and/or the transaction flow for the first open ticket 406 can define that the first open ticket 406 include the interactive add items 420 button, the interactive merge 422 items button, and the interactive process 424 the transaction button. Moreover, in some examples, the transaction flow for the first open ticket 406 can define when messages and/or alerts are presented via the first open ticket 406 based on process(es) for a restaurant area 414 type of transaction.

For instance, the transaction flow for the restaurant area 414 type of transaction can cause the first open ticket 406 to present messages indicating when the merchant should take drink orders, food orders, or desert orders from the first customer. Additionally, the transaction flow for the restaurant area 414 type of transaction can cause the POS device 402 to print a physical receipt (instead of sending a digital receipt) for the transaction.

The second open ticket 408 can include a bar area 414 type of transaction between the merchant and a second customer. As illustrated in FIG. 4, elements included in the second open ticket 408 for the bar area 426 type of transaction include a seat number 428, a list of items 430, an interactive add items 432 button, an interactive merge 434 tickets button, and an interactive process 436 the transaction button.

The seat number 428 can include text indicating a seat that the second customer is seated at within the bar area of the physical establishment of the merchant. For instance, the seat number 428 can indicate that the second customer is seated at seat six. The list of items 430 can indicate one or more items ordered by the second customer during a course of the transaction. The interactive add items 432 button can include an interactive element of the second open ticket 408 that the merchant can select to add additional items to the second open ticket 408. The interactive merge 434 button can include an interactive element of the second open ticket 408 that the merchant can select to merge the second open ticket 408 with one or more additional open tickets (e.g., open tickets 406, 410, 412). Finally, the interactive process 436 transaction button can include an interactive element of the second open ticket 408 that the merchant can select to process the second open ticket 408 at the end of the transaction.

In some examples, a predefined ticket template and/or the transaction flow for the second open ticket 408 can configure the second open ticket 408 to include the elements 426-436. For instance, the predefined ticket template of the second open ticket 408 can define that the second open ticket 408 includes text indicating the bar area 426 type of transaction, the seat number 428, and the list of items 430. Additionally, the predefined ticket template and/or the transaction flow for the second open ticket 408 can define that the second open ticket 408 includes the interactive add items 432 button, the interactive merge 434 tickets button, and the interactive process 436 the transaction button. Moreover, in some examples, the transaction flow for the second open ticket 408 can define when messages and/or alerts are presented via the second open ticket 408 based on process(es) for a bar area 426 type of transaction.

For instance, the transaction flow for the bar area 426 type of transaction can cause the second open ticket 408 to present messages indicating when the merchant should ask the second customer if he/she would like another drink. Additionally, the transaction flow for the bar area 426 type of transaction can cause the second open ticket 408 to present a message indicating that the merchant should ask the second customer if he/she would like to order food. Moreover, the transaction flow for the bar area 426 type of transaction can cause the POS device 402 to print a physical receipt (instead of sending a digital receipt) for the transaction.

The third open ticket 410 can include a waitlist area 438 type of transaction between the merchant and a third customer. As illustrated in FIG. 4, elements included in the third open ticket 410 for the waitlist area 438 type of transaction include a waitlist position 440, a list of items 442, an interactive add items 444 button, an interactive transaction type 446 button, and an interactive process 448 the transaction button.

The waitlist position 440 can include text indicating a position on a waitlist associated with the third customer. For instance, the waitlist position 440 can indicate that the third customer is next to be seated and/or that the estimated wait time for the third customer is five minutes. The list of items 442 can indicate one or more items ordered by the third customer during a course of the transaction. The interactive add items 444 button can include an interactive element of the third open ticket 410 that the merchant can select to add additional items to the third open ticket 410. The interactive transaction type 446 button can include an interactive element of the third open ticket 410 that the merchant can select to update a type of transaction associated with the third open ticket 410 when the customer is seated at the physical establishment of the merchant. Finally, the interactive process 448 transaction button can include an interactive element of the third open ticket 410 that the merchant can select to process the third open ticket 410 at the end of the transaction.

In some examples, a predefined ticket template and/or the transaction flow for the third open ticket 410 can configure the third open ticket 410 to include the elements 438-448. For instance, the predefined ticket template can define that the third open ticket 410 includes text indicating the waiting area 438 type of transaction, the waitlist position 440, and the list of items 442. Additionally, the predefined ticket template and/or the transaction flow for the third open ticket 410 can define that the third open ticket 410 include the interactive add items 444 button, the interactive transaction type 446 button, and the interactive process 448 the transaction button. Moreover, in some examples, the transaction flow for the third open ticket 410 can define when messages and/or alerts are presented via the third open ticket 410 based on process(es) for a waitlist area 438 type of transaction.

For instance, the transaction flow for the waitlist area 438 type of transaction can cause the third open ticket 410 to present messages indicating when to update the third customer about the estimated wait time. Additionally, if the merchant closes the transaction before seating the third customer, the transaction flow for the waitlist area 438 type of transaction can cause the POS device 402 to print a physical receipt (instead of sending a digital receipt) for the transaction.

The fourth open ticket 412 can include a delivery 450 type of transaction between the merchant and a fourth customer. As illustrated in FIG. 4, elements included in the fourth open ticket 412 for the delivery 450 type of transaction include an address 452, a list of items 454, an interactive add items 456 button, an interactive route to driver 458 button, and an interactive process 460 the transaction button.

The address 452 can include text indicating an address associated with the fourth customer. The list of items 454 can indicate one or more items ordered by the fourth customer for delivery. The interactive add items 456 button can include an interactive element of the fourth open ticket 412 that the merchant can select to add additional items to the third open ticket 410. The interactive route to driver 458 button can include an interactive element of the fourth open ticket 412 that the merchant can select to route the order to one of the merchant's drivers. Finally, the interactive process 460 transaction button can include an interactive element of the fourth open ticket 412 that the merchant can select to process the fourth open ticket 412 at the end of the transaction.

In some examples, a predefined ticket template and/or the transaction flow for the fourth open ticket 412 can configure the fourth open ticket 412 to include the elements 450-460. For instance, the predefined ticket template can define that the fourth open ticket 412 includes text indicating the delivery 450 type of transaction, the address 452, and the list of items 454. Additionally, the predefined ticket template and/or the transaction flow for the fourth open ticket 412 can define that the fourth open ticket 412 include the interactive add items 456 button, the interactive route to driver 458 button, and the interactive process 460 the transaction button. Moreover, in some examples, the transaction flow for the fourth open ticket 412 can define when messages and/or alerts are presented via the fourth open ticket 412 based on process(es) for a delivery 450 type of transaction.

For instance, the transaction flow for the delivery 450 type of transaction can cause the fourth open ticket 412 to present a message indicating that the merchant needs to input the address 452 of the fourth customer. Additionally, the transaction flow for the delivery 450 type of transaction can cause the fourth open ticket 412 to indicate that the merchant needs to route the delivery to a driver. Moreover, the transaction flow for the delivery 450 type of transaction can cause the POS device 402 to send a digital receipt (instead of printing a physical receipt) for the transaction to the fourth customer.

Figure 5A:
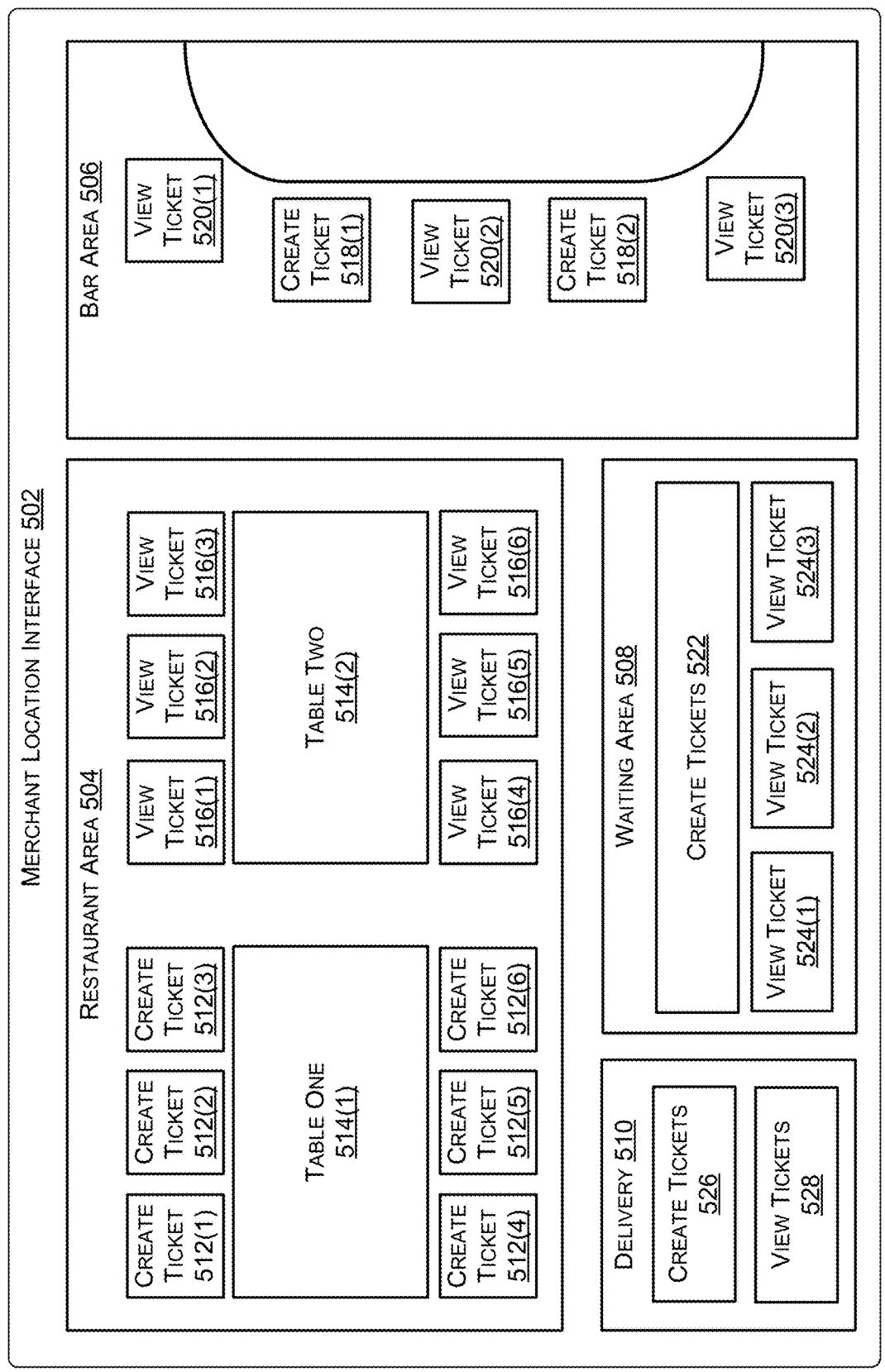
FIGS. 5A-5B are example illustrations of user interfaces for creating open tickets using predefined templates.
Figure 5B:
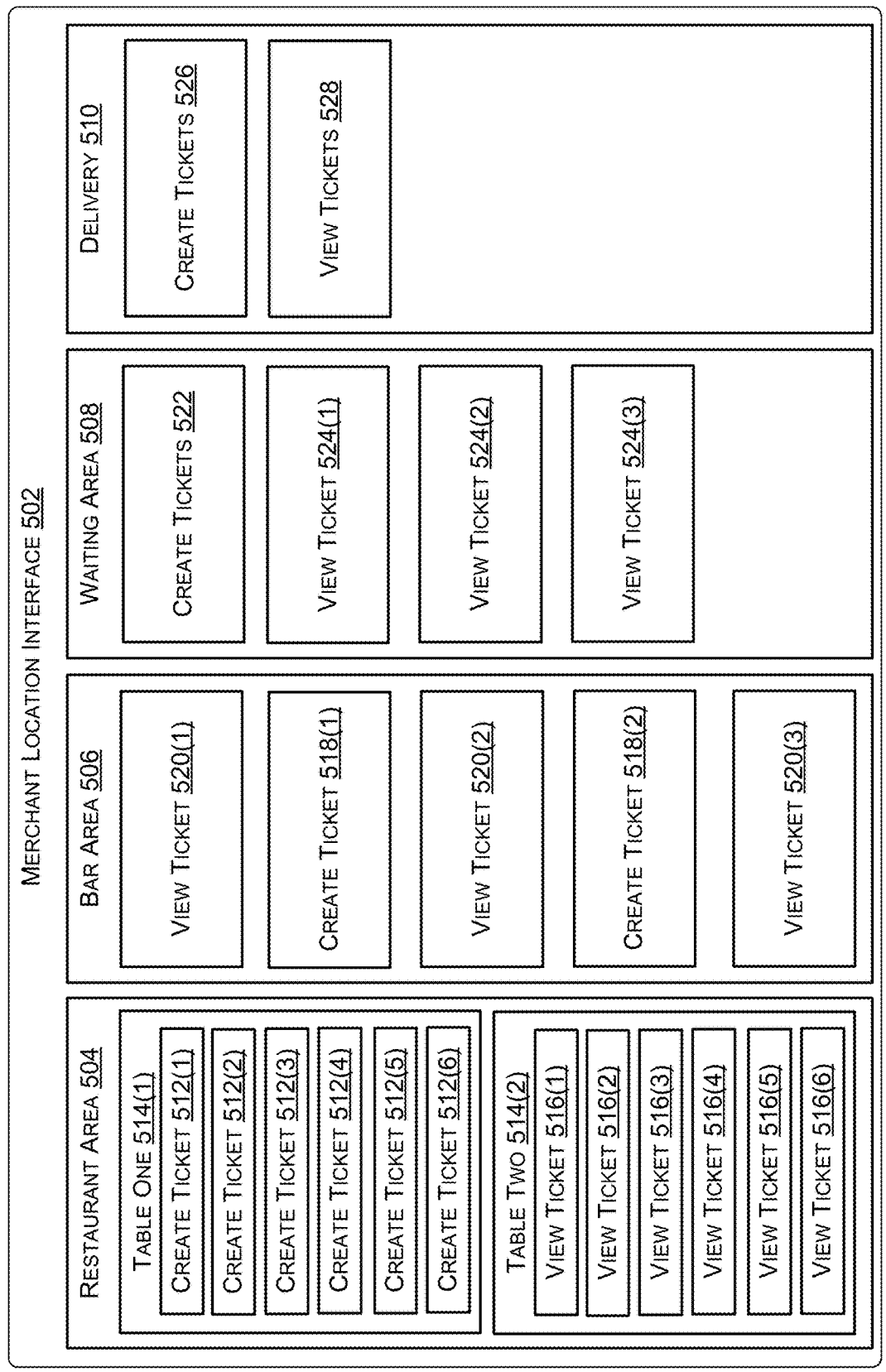

FIGS. 5A-5B are example illustrations of user interfaces for creating open tickets using predefined templates. For instance, in the example of FIG. 5A, the merchant location interface 502 (which can represent the payment service interface 136) includes a representation of a merchant's physical location. For instance, the merchant's physical location can include a restaurant area 504, a bar area 506, and a waitlist area 508. Additionally, the merchant location interface 502 includes a position for delivery 510 type transactions.

In the example of FIG. 5A, the merchant can use the merchant location interface 502 to generate open tickets for customers. For instance, the merchant can use one of the interactive create tickets 512(1)-(6) buttons within the restaurant area 504 of the merchant location interface 502 to create open tickets for restaurant area types of transactions (e.g., the first open ticket 406). As illustrated in FIG. 5A, the merchant is able to create tickets 512(1)-(6) for the restaurant area 504 are around table one 514(1). The merchant can further use one of the interactive view tickets 516(1)-(6) to view open tickets that are already open for transactions with customers. As illustrated in FIG. 5A, the merchant is able to view tickets 516(1)-(6) for the restaurant area 504 around table two 514(2). For instance, table one 514(1) within the restaurant area 504 may be open, however, table two 514(2) within the restaurant area may be filled with customers.

In the example of FIG. 5A, the merchant can use the interactive create tickets 518(1)-(2) buttons within the bar area 506 of the merchant location interface 502 to create open tickets for bar area types of transactions (e.g., the second open ticket 408). Additionally, the merchant can use the interactive view tickets 520(1)-(3) buttons to view open tickets that are already open for transaction with customers within the bar area 506. In some examples, each of the interactive create tickets 518(1)-(2) buttons and each of the interactive view tickets 520(1)-(3) buttons can be associated with a respective seat within the bar area 506 of the merchant's physical establishment. In some examples, each of the interactive create tickets 518(1)-(2) buttons and each of the interactive view tickets 520(1)-(3) buttons can be associated with either a seat and/or a defined location within the bar area 506 of the merchant's physical establishment.

In the example of FIG. 5A, the merchant can use the interactive create tickets 522 button within the waiting area 508 of the merchant location interface 502 to create open tickets for waiting area types of transactions (e.g., the third open ticket 410). Additionally, the merchant can use the interactive view tickets 524(1)-(3) buttons to view open tickets that are already open for transaction with customers within the waiting area 508. In some examples, each of the view tickets 524(1)-(3) may correspond to a respective customer within the waiting area 508. In some examples, the merchant can use the interactive create tickets 522 button to create any number open tickets for the waiting area 508.

In the example of FIG. 5A, the merchant can use the interactive create tickets button 526 within the delivery area 510 of the merchant location interface 502 to create open tickets for delivery types of transaction (e.g., the fourth open ticket 412). Additionally, the merchant can use the interactive view tickets 528 button to view open tickets that were already created for delivery types of transaction.

It should be noted that, in some examples, the each of the interactive buttons 512(1)-(6), 516(1)-(6), 518(1)-(2), and 520(1)-(3) can correspond to a specific location within the merchant's physical establishment. In such examples, the merchant location interface 502 may not allow the merchant to create open tickets for a specific location when there is already an open ticket at the specific location (e.g., when the interactive button includes a "view ticket" button). Additionally, when an open ticket is closed by the merchant, the merchant location interface 502 can update the interactive button for the specific location to indicate that the specific location is now open (e.g., update with an interactive "create ticket" button). The merchant can then use the interactive "create ticket" button at the specific location to create a new open ticket at the specific location.

In the example of FIG. 5B, the merchant location interface 502 includes lists for the different stations/zones of the merchant's physical establishment. For instance, the merchant location interface 502 includes a list for the restaurant area 504 that includes the interactive create tickets 512(1)-(6) buttons for table one 514(1) and the interactive view tickets 516(1)-(6) buttons for table two 514(2). The merchant location interface 502 further includes a list for the bar area 506 that includes the interactive create tickets 518(1)-(2) buttons and the interactive view tickets 520(1)-(3) buttons. Additionally, the merchant location interface 502 includes a list for the waiting area 508 that includes the interactive create tickets 522 button and the interactive view tickets 524(1)-(3) buttons. Finally, the merchant location interface 502 includes a list for the delivery area 510 that includes the interactive create tickets 526 button and the interactive view tickets 528 button.

As such, in some examples, the merchant location interface 502 can either present the merchant with a physical layout of the merchant's physical establishment or a list of different stations/zones within the merchant's physical establishment. Using either the physical layout or the list of different stations/zones, the merchant can use the merchant location interface 502 to generate open tickets for transactions that are based on the types of transactions that the merchant is conducting with customers.

Figure 6:
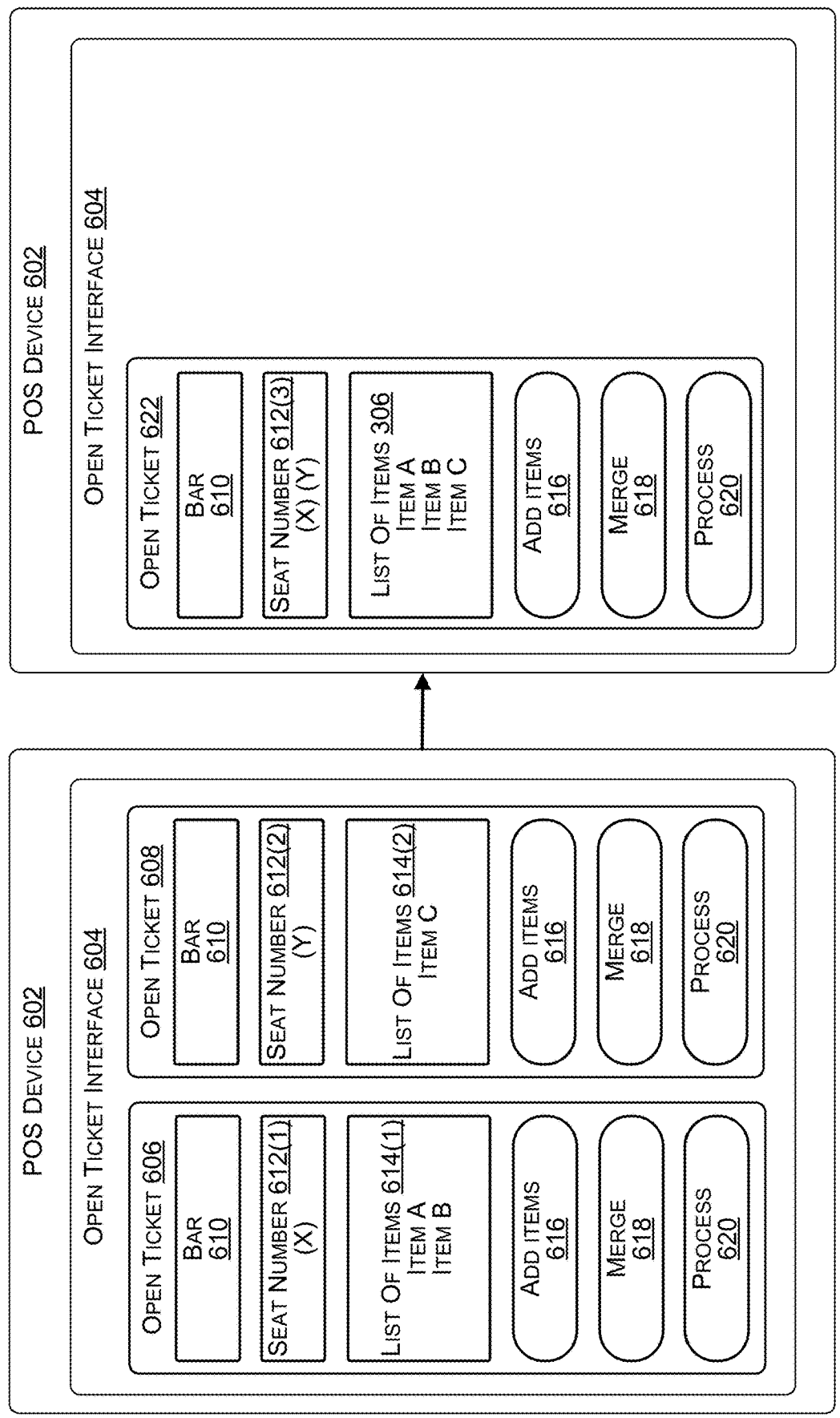
FIG. 6 is an example illustration of merging two open tickets in order to create a merged open ticket.

FIG. 6 is an example illustration of merging two open tickets in order to create a merged open ticket. For instance, in the example of FIG. 6, the POS device 602 is presenting an open ticket interface 604 that includes a first open ticket 606 and a second open ticket 608. In the example of FIG. 6, the POS device 602, the open ticket interface 604, and each of the open tickets 606-608 can correspond to the POS device 402, the open ticket interface 404, and the second open ticket 408, respectively. For instance, the bar area 610 a type of transaction, seat numbers 612(1)-(2), lists of items 614(1)-(2), interactive add items 616 button, interactive merge 618 tickets button, and interactive process 620 the transaction button can correspond to the bar area 426 type of transaction, the seat number 428, the list of items 430, the interactive add items 432 button, the interactive merge 434 tickets button, and the interactive process 436 the transaction button, respectively.

In the example of FIG. 6, a merchant can utilize the interactive merge 618 tickets button on one of the open tickets 606-608 to merge the open tickets 606-608. In some examples, merging the open tickets 606-608 together can include combining information included within the open ticket data structure of the first open ticket 606 with information included within the open ticket data structure of the second open ticket 608 in order to generate a merged open ticket data structure. For instance, in the example of FIG. 6, the list of items 612(2) of the merged open ticket 622 includes seat number "(X)" from the first open ticket 606 and set number "(Y)" from the second open ticket 608. Additionally, the list of items 614(3) of the merged open ticket 622 includes items "A" and "B" from the first open ticket 606 and item "C" from the second open ticket 608.

It should be noted that, in some examples, merging the open tickets 606-608 can further include creating a new associated versioning data structure for the merged open ticket 622. For instance, in some examples, the POS device 602 can create the new associated versioning data structure for the merged open ticket 622 using the associated versioning data structure from the first open ticket 606 and the associated versioning data structure from the second open ticket 608. By creating the new associated versioning data structure for the merged open ticket 622, POS devices that synchronize data with the POS device 602 can use the new associated versioning data structure to determine that the open tickets 606-608 were merged in order to create the merged open ticket 622.

Figure 7B:
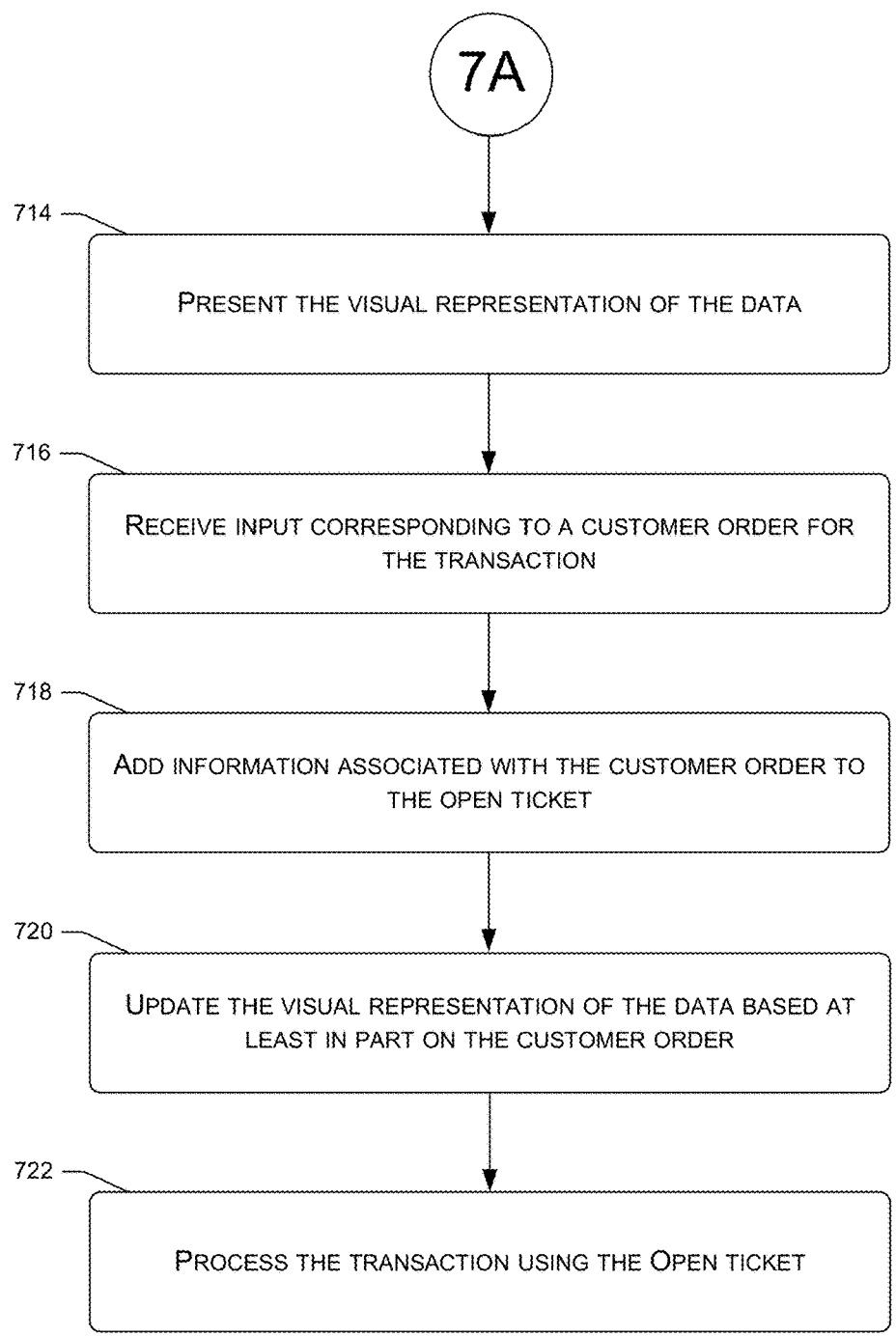

FIGS. 7A-7B are a flow diagram illustrating an example process 700 for integrating predefined templates with open ticket functionality. The process 700 and other processes described herein are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems. The process 700, and other processes described herein, may be performed by a remote payment service (e.g., computing device(s) 112), a POS device (e.g., merchant device(s) 108), by another entity, or by a combination thereof.

At block 702, the process 700 identifies a type of transaction between a merchant and a customer. For instance, a POS device can identify the type of transaction between the merchant and the customer. To identify the type of transaction, in some examples, the POS device receives input, via an input device, that identifies the type of transaction. In some examples, the POS device receives input, via the input device, identifying a group associated with the customer. In such examples, the POS device can use the group to determine the type of transaction.

At block 704, the process 700 selects a ticket type for the transaction from a plurality of predefined ticket types. For instance, the POS device can associate predetermined ticket templates (e.g., ticket types) with various types of transactions. The POS device can then use the associations to determine which predetermine ticket template (e.g., ticket type) from the predetermined ticket templates is associated with the identified type of transaction. Based on the determination, the POS device can select the predetermined ticket template.

At block 706, the process 700 generates an open ticket based at least in part on the ticket type. For instance, the POS device can generate an open ticket for the transaction using the predefined ticket template. As discussed above, the open ticket can include a data structure that stores cart information indicating items that are ordered by the customer from the merchant during the transaction. Additionally, in some examples, the open ticket can further include an associated versioning data structure indicating a version of the open ticket.

At block 708, the process 700 selects a transaction flow from a plurality of transaction flows and at block 710, the process 700 associates the transaction flow with the open ticket. For instance, the POS device can associate transaction flows with the predetermined ticket templates. The POS device can then use the associations to determine which transaction flow from the transaction flows is associated with the selected predetermined ticket template. Based on the determination, the POS device can select the transaction flow for the open ticket. Additionally, the POS device can associate the transaction flow with the open ticket.

At block 712, the process 700 generates a visual representation of data associated with the open ticket and at block 714, the process 700 presents the visual representation of the data. For instance, the POS device can generate the visual representation of the open ticket using data from the data structure of the open ticket. In some examples, a layout of the data within the visual representation can be based on the predetermined ticket template and/or the transaction flow. The POS device can then present the visual representation of the data via a display device.

At block 716, the process 700 receives input corresponding to a customer order for the transaction and at block 718, the process 700 adds information associated with the customer order to the open ticket. For instance, the POS device can receive, via the input device, data indicating one or more items item ordered by the customer from the merchant during a course of the transaction. Based on the input, the POS device can update the open ticket for the transaction. For instance, the POS device can add information associated with the one or more items to the data structure of the open ticket. In some examples, the POS device can further update the associated versioning data structure of the open ticket in order to indicate that the open ticket was updated.

At block 720, the process 700 updates the visual representation of the data based at least in part on the customer order. For instance, the POS device can update the visual representation of the data to indicate the one or more items ordered by the customer. In some examples, additionally or alternatively to updating the visual representation, the POS device can generate a new visual representation of the updated open ticket and present the new visual representation via the display device.

At block 722, the process 700 processes the transaction using the open ticket. For instance, in some examples, the POS device can receive payment information associated with a payment instrument of the customer. The POS device can then attempt to authorize the payment instrument for a cost of the open ticket. For instance, in some examples, the POS device can send the payment information to a third-party service (e.g., the computing device(s) 112) in order to cause the third-party service to process the payment instrument. In some examples, the POS device can send the payment information to a card payment network computing device (e.g., card payment network computing device(s) 164) in order to process the payment instrument.

Figure 8:
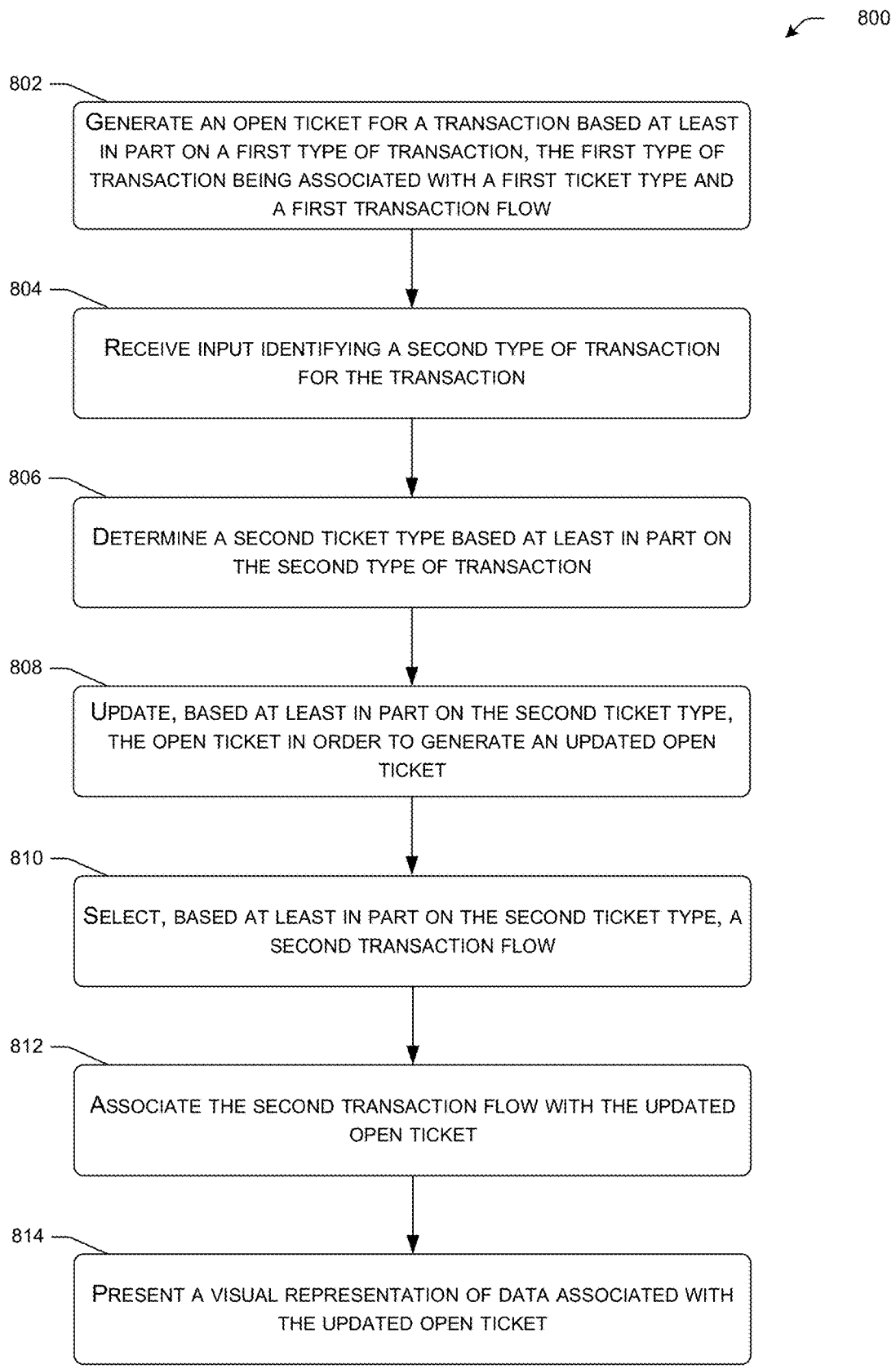
FIG. 8 is a flow diagram of illustrating an example process for updating an open ticket based on a type of transaction between a merchant and a customer changing.

FIG. 8 is a flow diagram of illustrating an example process 800 for updating an open ticket based on a type of transaction between a merchant and a customer changing. At block 802, the process 800 generates an open ticket for a transaction based at least in part on a first type of transaction, the first type of transaction being associated with a first ticket type and a first transaction flow. For instance, a POS device can generate the open ticket using the first predetermined template (e.g., the first ticket type) and the first transaction flow for the first type of transaction.

At block 804, the process 800 receives input identifying a second type of transaction for the transaction. For instance, in some examples, the POS device can receive input, via an input device, that identifies the second type of transaction. Additionally or alternatively, in some examples, the first POS device can receive input, via the input device, identifying a new group associated with the customer. In such examples, the POS device can identify the second type of transaction based on the new group.

At block 806, the process 800 determines a second ticket type for the transaction based at least in part on the second type of transaction and at block 808, the process 800 updates, based at least in part on the second ticket type, the open ticket in order to generate an updated open ticket. For instance, the POS device can use an association between the second type of transaction and a second predetermined ticket template (e.g., the second ticket type) to determine and/or select the second predetermined ticket template. The POS device can then update the open ticket using the second predetermined ticket template. For instance, the POS device can update elements included within the open ticket and/or a layout of the elements included within the open ticket based on the second predetermined ticket template. In some examples, the POS device can further update an associated versioning data structure associated with the open ticket.

At block 810, the process 800 selects, based at least in part on the second ticket type, a second transaction flow and at block 812, the process 800 associates the second transaction flow with the updated open ticket. For instance, the POS device can select the second transaction flow based on an association between the second transaction flow and the second predetermined ticket template. The POS device can then associate the second transaction flow with the updated open ticket.

At block 814, the process presents a visual representation of data associated with the updated open ticket. For instance, the POS device can generate the visual representation of the data using the data structure of the open ticket. In some examples, a layout of the visual representation of the data is based on the second predefined ticket template and the second transaction flow. The POS device can then present the visual representation of the data via a display device.

In some examples, the POS device can further synchronize the updated open ticket with one or more other POS devices associated with the merchant. For instance, the POS device can send ticket data associated with the updated open ticket to the one or more other POS devices. In some examples, the ticket data can include the updated associated versioning data structure. In such examples, the updated associated versioning data structure of the updated open ticket can cause the one or more other POS devices to update the open ticket stored locally on the one or more other POS devices to the updated open ticket.

Figure 9:
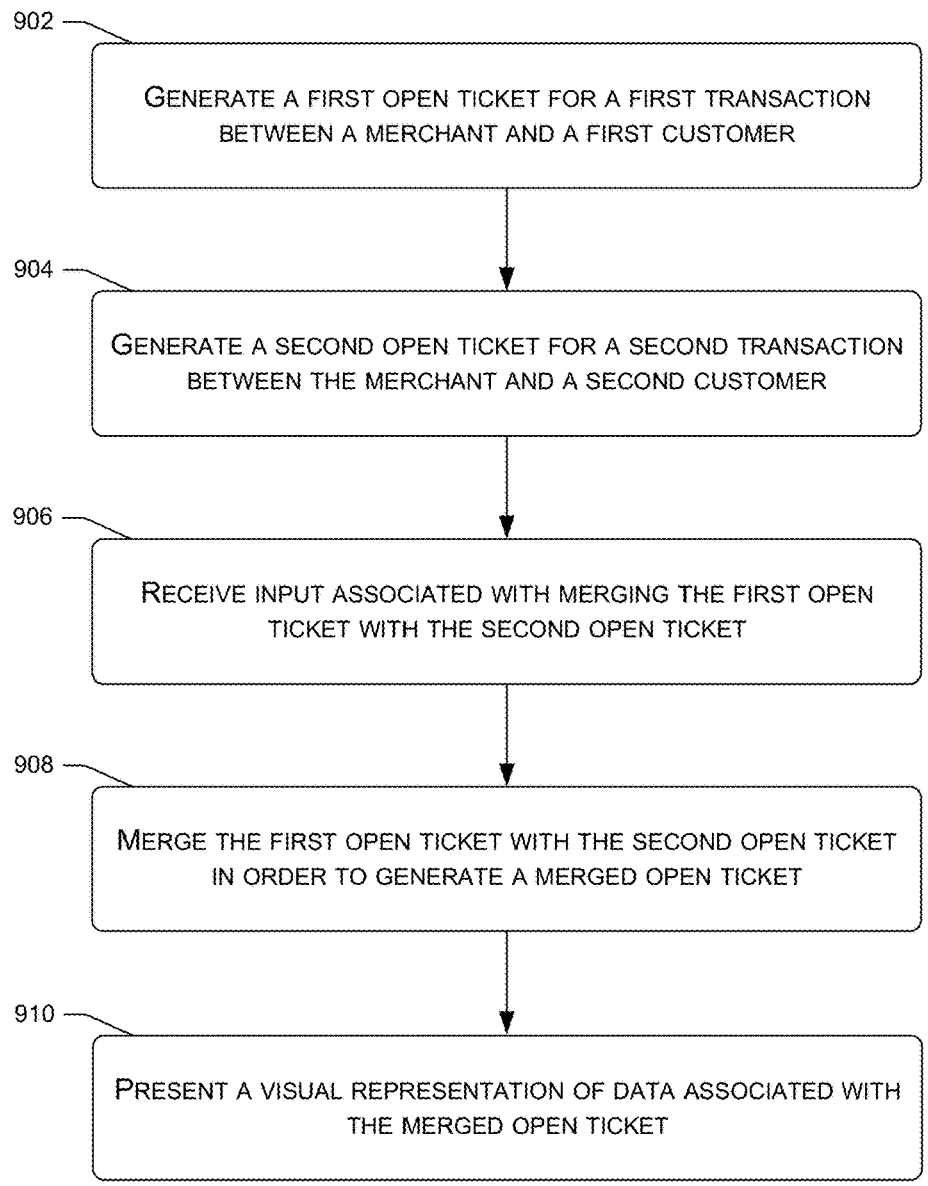
FIG. 9 is a flow diagram of an example process for merging two open tickets in order to generate a merged open ticket.

FIG. 9 is a flow diagram of an example process 900 for merging two open tickets in order to generate a merged open ticket. At block 902, the process 900 generates a first open ticket for a first transaction between a merchant and a first customer. For instance, a POS device can receive input associated with the first transaction. The POS device can then generate a first open ticket data structure for the first transaction based on the input. In some examples, the first open ticket data structure includes at least data indicating items ordered by the first customer from the merchant.

At block 904, the process 900 generates a second open ticket for a second transaction between the merchant and a second customer. For instance, the POS device can receive input associated with the second transaction. The POS device can then generate a second open ticket data structure for the second transaction based on the input. In some examples, the second open ticket data structure includes at least data indicating items ordered by the second customer from the merchant.

At block 906, the process 900 receives input associated with merging the first open ticket with the second open ticket and at block 908, the process 900 merges the first open ticket with the second open ticket in order to generate a merged open ticket. For instance, the POS device can receive input associated with merging the first open ticket data structure with the second open ticket data structure. Based on the input, the POS device can merge the first open ticket data structure with the second open ticket data structure in order to generate a merged open ticket data structure. In some examples, the merged open ticket data structure can include at least the items order by the first customer from the merchant and the items ordered by the second customer from the merchant.

At block 910, the process 900 presents a visual representation of data associated with the merged open ticket. For instance, the POS device can generate the visual representation of the data using the merged open ticket data structure. In some examples, a layout of the visual representation of the data is based on a type of transaction associated with the merged open ticket data structure. The POS device can then present the visual representation of the data via a display device.

Figure 10:
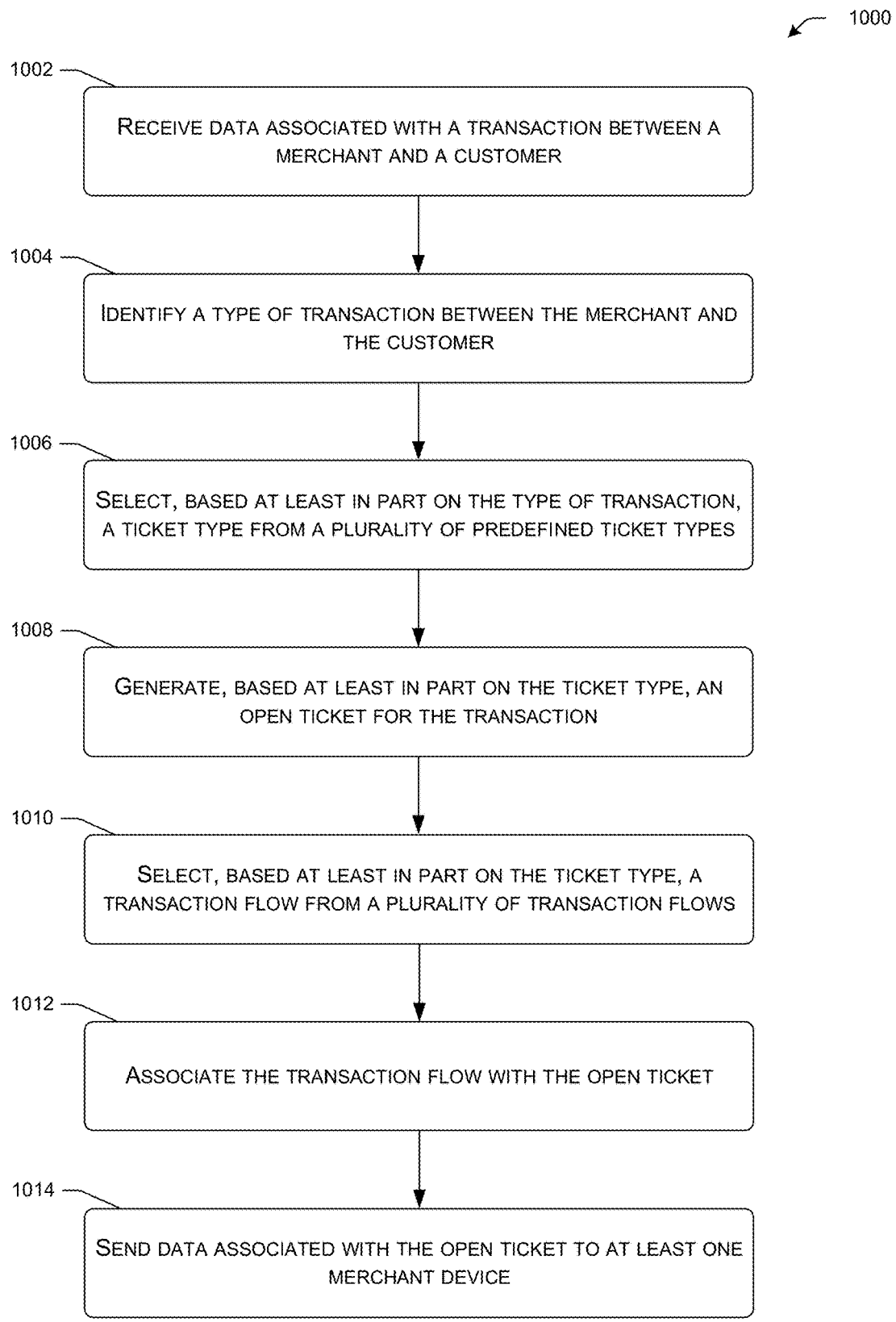
FIG. 10 is a flow diagram illustrating an example process of a third-party service integrating predefined templates with open ticket functionality.

FIG. 10 is a flow diagram illustrating an example process 1000 of a third-party service integrating predefined templates with open ticket functionality. At block 1002, the process 1000 receives data associated with a transaction between a merchant and a customer. For instance, a third-party service (e.g., the computing device(s) 112) can receive the data associated with the transaction from a POS device. In some examples, the data can indicate an identity of the merchant, a location of the merchant, an identity of the customer associated with the transaction, the personal information associated with the customer, a location of the customer within the physical establishment of the merchant, items order by the customer during a course of the transaction (e.g., cart information), timestamps for each of the items ordered by the customer during the course of the transaction, a cost associated with each of the items, or other information associated with the transaction.

At block 1004, the process 1000 identifies a type of transaction between the merchant and the customer. For instance, third-party service can identify the type of transaction between the merchant and the customer using the received data. In some examples, the data identifies the type of transaction. In some examples, the data identifies a group associated with the customer. In such examples, the third-party service can use the group to determine the type of transaction.

At block 1006, the process 1000 selects, based at least in part on the type of transaction, a ticket type for the transaction from a plurality of predefined ticket types. For instance, the third-party service can associate predetermined ticket templates (e.g., ticket types) with various types of transactions. The third-party service can then use the associations to determine which predetermine ticket template (e.g., ticket type) from the predetermined ticket templates is associated with the identified type of transaction. Based on the determination, the third-party service can select the predetermined ticket template.

At block 1008, the process 1000 generates, based at least in part on the ticket type, an open ticket for the transaction. For instance, the third-party service can generate an open ticket for the transaction using the predefined ticket template. As discussed above, the open ticket can include a data structure that stores cart information indicating items that are ordered by the customer from the merchant during the transaction. Additionally, in some examples, the open ticket can further include an associated versioning data structure indicating a version of the open ticket.

At block 1010, the process 1000 selects, based at least in part on the ticket type, a transaction flow from a plurality of transaction flows and at block 1012, the process 1000 associates the transaction flow with the open ticket. For instance, the third-party service can associate transaction flows with the predetermined ticket templates. The third-party service can then use the associations to determine which transaction flow from the transaction flows is associated with the selected predetermined ticket template. Based on the determination, the third-party service can select the transaction flow for the open ticket. Additionally, the third-party service can associate the transaction with the open ticket.

At block 1014, the process 1000 sends data associated with the open ticket to at least one merchant device. For instance, the third-party service can send data associated with the open ticket to one or more POS device associated with the merchant. The one or more POS device can then use the received data to present a visual representation of data for the open ticket. In some examples, a layout of the visual representation of the data is based on the predetermined ticket template and/or the transaction flow.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method implemented by a point-of-sale (POS) application comprising instructions executable by one or more processors of a device operable by a merchant, the method comprising:
   receiving, via an interface of the device that is presented via the POS application, input associated with a transaction between the merchant and a customer;
   determining, based at least in part on the input, a transaction type associated with the transaction;
   generating a data structure storing data associated with the transaction;
   determining, based at least in part on the transaction type, a transaction flow from a plurality of predefined transaction flows, wherein the transaction flow defines one or more processes that the merchant is to perform during a course of the transaction with the customer;
   associating the transaction flow with the data structure;
   determining, based on the transaction type associated with the transaction, a template defining a visual representation of the data; and
   presenting the visual representation of the data via the interface of the device.

2. The method of claim 1, wherein determining the template comprises accessing a database comprising a plurality of predefined templates and each template corresponds to a different transaction type.

3. The method of claim 1, wherein the template defines a layout of the data associated with the data structure, including one or more of graphics, text, or interactive elements.

4. The method of claim 1, wherein the one or more processes include one or more of a time at which to (i) input data associated with the customer, (ii) input data associated with customer orders, or (iii) process the transaction.

5. The method of claim 1, wherein the transaction type comprises (i) a delivery transaction, (ii) a transaction within a zone of a physical establishment of the merchant, (iii) a transaction within a station of the physical establishment, or (iv) a transaction within a defined area of the physical establishment.

6. The method of claim 1, further comprising:
   receiving additional input associated with the transaction between the merchant and the customer;
   determining, based at least in part on the additional input, a new transaction type associated with the transaction;
   updating, based at least in part on the new transaction type, the data structure in order to generate an updated data structure;
   determining, based at least in part on the new transaction type, a new transaction flow from the plurality of predefined transaction flows;
   associating the new transaction flow with the updated data structure;
   determining, based on the new transaction type, a new template defining a new visual representation of data associated with the updated data structure; and
   presenting the new visual representation of the data via the interface of the device.

7. The method of claim 6, wherein the data structure includes an associated versioning data structure indicating a version of the data structure, and wherein the method further comprises:

updating, based at least in part on generating the updated data structure, the associated versioning data structure in order to indicate that the data structure has been updated; and causing, based at least in part on updating the associated versioning data structure, one or more other POS devices to locally update the data structure stored on the one or more other POS devices to the updated data structure.

8. The method of claim 1, wherein the input identifies a group associated with the customer, and wherein determining the transaction type is based at least in part on the group.

9. The method of claim 8, further comprising:
receiving additional input associated with merging the data structure with an additional data structure in the group;
merging the data structure with the additional data structure to create a new data structure, wherein the new data structure stores data associated with the transaction with the customer and data associated with another transaction by an additional customer;
determining a new template defining a new visual representation of the data associated with the new data structure; and
presenting the new visual representation of the data via the interface of the device.

10. A system comprising:
one or more processors; and
one or more computer-readable media storing instructions executable by the one or more processors, the instructions programming the one or more processors to perform operations comprising:
receiving input associated with a transaction between a merchant and a customer;
determining, based at least in part on the input, a transaction type associated with the transaction;
generating a data structure storing data associated with the transaction;
determining, based at least in part on the transaction type, a transaction flow from a plurality of predefined transaction flows, wherein the transaction flow defines one or more processes that the merchant is to perform during a course of the transaction with the customer;
associating the transaction flow with the data structure;
determining, based on the transaction type associated with the transaction, a template defining a visual representation of the data; and
presenting the visual representation of the data via a display of a device operable by the merchant.

11. The system of claim 10, wherein the input identifies a group associated with the customer, and wherein determining the transaction type is based at least in part on the group.

12. The system of claim 11, further comprising:
receiving additional input associated with merging the data structure with an additional data structure in the group;
merging the data structure with the additional data structure to create a new data structure, the new data structure storing data associated with the transaction by the customer and data associated with another transaction by an additional customer;
determining a new template defining a new visual representation of the data associated with the new data structure; and
presenting the new visual representation of the data via the display of the device operable by the merchant.

13. The system of claim 10, further comprising:
receiving additional input associated with the transaction between the merchant and the customer;
determining, based at least in part on the additional input, a new transaction type associated with the transaction;
updating based at least in part on the new transaction type, the data structure in order to generate an updated data structure;
determining, based at least in part on the new transaction type, a new transaction flow from the plurality of predefined transaction flows;
associating the new transaction flow with the updated data structure;
determining, based on the new transaction type, a new template defining a new visual representation of data associated with the updated data structure; and
presenting the new visual representation of the data via the display of the device operable by the merchant.

14. The system of claim 10, wherein the data structure is associated with an open ticket.

15. One or more computer-readable media storing instructions executable by one or more processors that, when executed by the one or more processors, cause the one or more processors to perform acts comprising:
receiving input associated with a transaction between a merchant and a customer;
determining, based at least in part on the input, a transaction type associated with the transaction;
generating a data structure storing data associated with the transaction;
determining, based at least in part on the transaction type, a transaction flow from a plurality of predefined transaction flows, wherein the transaction flow defines one or more processes that the merchant is to perform during a course of the transaction with the customer;
associating the transaction flow with the data structure;
determining, based on the transaction type associated with the transaction, a template defining a visual representation of the data; and
presenting the visual representation of the data via a display of a point-of-sale (POS) device.

16. The one or more computer-readable media as claim 15 recites, wherein the input identifies a group associated with the customer, and wherein determining the transaction type is based at least in part on the group.

17. The one or more computer-readable media as claim 16 recites, the acts further comprising:
receiving additional input associated with merging the data structure with an additional data structure in the group;
merging the data structure with the additional data structure to create a new data structure, the new data structure storing data associated with the transaction by the customer and data associated with another transaction by an additional customer;
determining a new template defining a new visual representation of the data associated with the new data structure; and
presenting the new visual representation of the data via the display of the POS device.

18. The one or more computer-readable media as claim 15 recites, the acts further comprising:
receiving additional input associated with the transaction between the merchant and the customer;
determining, based at least in part on the additional input, a new transaction type associated with the transaction;

updating based at least in part on the new transaction type, the data structure in order to generate an updated data structure;

determining, based at least in part on the new transaction type, a new transaction flow from the plurality of predefined transaction flows;

associating the new transaction flow with the updated data structure;

determining, based on the new transaction type, a new template defining a new visual representation of data associated with the updated data structure; and presenting the new visual representation of the data via the display of the POS device.

19. The one or more computer-readable media as claim 18 recites, wherein the data structure includes an associated versioning data structure indicating a version of the data structure, and wherein the acts further comprise:

updating, based at least in part on generating the updated data structure, the associated versioning data structure in order to indicate that the data structure has been updated; and causing, based at least in part on updating the associated versioning data structure, one or more other POS devices to locally update the data structure stored on the one or more other POS devices to the updated data structure.

20. The one or more computer-readable media as claim 15 recites, wherein the data structure is associated with an open ticket.

\* \* \* \* \*